(12) United States Patent
Nakagawa et al.

(10) Patent No.: US 7,621,644 B2
(45) Date of Patent: Nov. 24, 2009

(54) PROJECTOR WITH EXHAUST FANS HAVING INTERSECTING EXHAUST DIRECTIONS

(75) Inventors: Norio Nakagawa, Neyagawa (JP); Toshihiro Saruwatari, Kishiwada (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 489 days.

(21) Appl. No.: 11/488,095

(22) Filed: Jul. 18, 2006

(65) Prior Publication Data

US 2007/0019168 A1  Jan. 25, 2007

(30) Foreign Application Priority Data

Jul. 19, 2005  (JP)  ............... 2005-209288

(51) Int. Cl.
- G03B 21/16 (2006.01)
- G03B 21/18 (2006.01)
- H04N 5/74 (2006.01)
- F21V 29/00 (2006.01)

(52) U.S. Cl. ............... 353/58; 353/52; 353/57; 348/748; 362/294

(58) Field of Classification Search ............ 353/52, 353/57–59; 348/748; 372/34
See application file for complete search history.

(56) References Cited

U.S. PATENT DOCUMENTS

| | | | | |
|---|---|---|---|---|
| 6,065,838 | A * | 5/2000 | Konuma et al. | 353/61 |
| 6,481,854 | B1 * | 11/2002 | Sugawara et al. | 353/52 |
| 6,739,831 | B2 * | 5/2004 | Hsu et al. | 415/60 |
| 6,913,361 | B2 * | 7/2005 | Gishi et al. | 353/58 |
| 6,957,892 | B2 * | 10/2005 | Kuroda | 353/61 |
| 7,018,049 | B2 * | 3/2006 | Wu et al. | 353/58 |
| 7,083,285 | B2 * | 8/2006 | Hsu et al. | 353/61 |
| 7,393,109 | B2 * | 7/2008 | Arboix | 353/57 |
| 2004/0240177 | A1 * | 12/2004 | Suzuki et al. | 361/695 |
| 2005/0030485 | A1 * | 2/2005 | Oketani | 353/58 |
| 2005/0122721 | A1 * | 6/2005 | Hori | 362/268 |
| 2008/0094581 | A1 * | 4/2008 | Nakagawa et al. | 353/58 |
| 2008/0252858 | A1 * | 10/2008 | Zheng et al. | 353/58 |

(Continued)

FOREIGN PATENT DOCUMENTS

JP  61125097 U  8/1986

(Continued)

OTHER PUBLICATIONS

Japanese Office Action mailed Feb. 27, 2007, Application No. 2005-209288.

(Continued)

*Primary Examiner*—Diane I Lee
*Assistant Examiner*—Jori S Byrne-Diakun
(74) *Attorney, Agent, or Firm*—Westerman, Hattori, Daniels & Adrian, LLP

(57) ABSTRACT

A liquid crystal projector device of the present invention includes a casing having disposed therein a lamp unit, an optical system for receiving light from the lamp unit to generate image light, and a power unit. An exhaust system for cooling an inside of the casing is attached to a side surface of the casing. The exhaust system includes a first exhaust fan and a second exhaust fan, which stand along the side surface of the casing. The first exhaust fan is placed toward the lamp unit, while the second exhaust fan is placed toward the power unit. Exhaust directions of both exhaust fans intersect each other.

5 Claims, 21 Drawing Sheets

U.S. PATENT DOCUMENTS

2008/0284985 A1* 11/2008 Suzuki .................. 353/58

FOREIGN PATENT DOCUMENTS

| JP | 2-754 U | 1/1990 |
|---|---|---|
| JP | 8-275096 A | 10/1996 |
| JP | 11-087963 A | 3/1999 |
| JP | 2002-055389 A | 2/2002 |
| JP | 2002-244215 | 8/2002 |
| JP | 2004-258301 | 9/2004 |
| JP | 2005-062375 A | 3/2005 |

OTHER PUBLICATIONS

Japanese Office Action for 2005-209288 mailed on May 8, 2007.
Japanese Office Action dated Jul. 17, 2007, Application No. 2005-209288.

* cited by examiner

LIGHT INCIDENCE DIRECTION

PROJECTOR WITH EXHAUST FANS HAVING INTERSECTING EXHAUST DIRECTIONS

The priority application Number 2005-209288 upon which this patent application is based is hereby incorporated by reference.

BACKGROUND OF THE INVENTION

1. Field of the Invention

The present invention relates to a projector device adapted to guide light from a light source to an optical system to generate image light for magnification projection on a forward screen.

2. Description of Related Art

A conventional projector device of this type includes a casing having disposed therein a lamp for serving as a light source, and an optical system including a polarization beam splitter, a polarizing plate, liquid crystal panels, a projection lens, etc. An exhaust system is arranged along a wall surface in the casing. The exhaust system causes air inside the casing to flow to thereby prevent temperature rise inside the casing (see JP 8-275096, A).

However, because the exhaust system is usually placed with an inlet direction thereof toward the lamp with a great heat amount, the exhaust system discharges high temperature air, so that a user could feel uncomfortable when touching the exhaust. Therefore, it is necessary to rotate an exhaust fan at a high speed in order to lower the exhaust temperature. This has resulted in a problem of increased noise occurring from the exhaust system.

SUMMARY OF THE INVENTION

An object of the present invention is to provide a projector device adapted to lower the exhaust temperature without rotating the exhaust fan at a high speed.

A projector device of the present invention includes a casing having disposed therein a light source and an optical system for receiving light from the light source to generate image light, the casing having a wall surface having attached thereto an exhaust system for cooling an inside of the casing.

The exhaust system includes a first exhaust fan and a second exhaust fan, which stand along the wall surface of the casing, the first exhaust fan being placed with an inlet direction thereof toward the light source, with the second exhaust fan being placed with an inlet direction thereof toward an area deviating from the light source, both exhaust fans having exhaust directions intersecting each other.

Specifically, the second exhaust fan is placed with the inlet direction toward a power unit arranged in a position spaced apart from the light source.

With the projector device of the present invention, because the first exhaust fan included in the exhaust system is placed with the inlet direction toward the light source, the first exhaust fan draws high temperature air emitted from the light source. On the other hand, the second exhaust fan draws lower temperature air than that of the air drawn by the first exhaust fan because the second exhaust fan is placed with the inlet direction toward the area deviating from the light source. Because the exhaust directions of both exhaust fans intersect each other, the air drawn from the first exhaust fan and the air drawn from the second exhaust fan are mixed and then discharged. Consequently, the exhaust temperature is lower than that of the conventional projector device.

Therefore, according to the projector device of the present invention, an exhaust temperature equal to or lower than that of the conventional one can be achieved at a rotation speed lower than that of the exhaust fan of the conventional exhaust system. This allows reduced noise occurring from the exhaust system.

Specifically, an intersection angle between an exhaust direction of the first exhaust fan and an exhaust direction of the second exhaust fan is set in a range of 40 degrees to 60 degrees.

The more increases the intersection angle between the exhaust direction of the first exhaust fan and the exhaust direction of the second exhaust fan, the larger is a necessary space inside the casing for mounting both exhaust fans. Accordingly, in order to find the intersection angle between the exhaust direction of the first exhaust fan and the exhaust direction of the second exhaust fan that gives the maximum exhaust temperature-lowering effect, an experiment was conducted where variations in exhaust temperature are measured with the intersection angle as a parameter. The result is that the intersection angle within a range of 40 degrees to 60 degrees gives the maximum exhaust temperature-lowering effect.

That is, if the intersection angle is smaller than 40 degrees, then the air drawn from both exhaust fans is discharged without sufficiently mixed. Consequently, high temperature air is discharged from the first exhaust fan side of the exhaust system, and low temperature air is discharged from the second exhaust fan side.

In contrast, when the intersection angle is in the range of 40 degrees to 60 degrees, the high temperature air drawn from the first exhaust fan and the low temperature air drawn from the second exhaust fan are sufficiently mixed. Consequently, sufficient lowering effect for the exhaust temperature can be achieved.

However, if the intersection angle is greater than 60 degrees, the lowering degree of the exhaust temperature relative to the increase of the intersection angle is smaller than in the case where the intersection angle is in the range of 40 degrees to 60 degrees. If the intersection angle approximates 90 degrees, then the high temperature air drawn from the first exhaust fan and the low temperature air drawn from the second exhaust fan hit each other. This inhibits a smooth rearward flow of air.

Therefore, according to the above specific configuration, the exhaust temperature can be lowered while minimizing enlargement of the device due to an increased mounting space for the exhaust system.

Specifically, the first exhaust fan and the second exhaust fan are each attached with an inclination angle relative to the wall surface of the casing. If one of the first and second exhaust fans is placed parallel with the wall surface of the casing, for example, the other fan must be placed greatly inclinedly relative to the wall surface of the casing, requiring a large space for mounting the exhaust system. In contrast, with the above specific configuration, the first exhaust fan and the second exhaust fan have the same or approximately same inclination angle relative to the wall surface of the casing, thereby keeping the necessary space for mounting the exhaust system to the minimum.

Further specifically, the projector device of the present invention is adapted to change intensity of the light emitted from the light source to a plurality of levels, and includes control means for variably setting revolutions of the first exhaust fan and/or the second exhaust fan depending on the intensity of the light. With the specific configuration, the projector device has a low power consumption mode where the power consumption is reduced by lowering the intensity of the light emitted from the light source. When the low power consumption mode is set, the noise occurring from the exhaust system can be further reduced by reducing the revolutions of the first and second exhaust fans.

As described above, according to the projector device of the present invention, the exhaust temperature can be lowered without rotating the exhaust fan at a high speed.

DETAILED DESCRIPTION OF THE INVENTION

The present invention embodied in a liquid crystal projector device will be specifically described below with reference to the drawings. In the description given below, the image projection direction of the liquid crystal projector device shown in FIG. 1 is defined as the forward direction, and right and left are defined by facing the front face of the liquid crystal projector device.

Overall Construction

Figure 1:
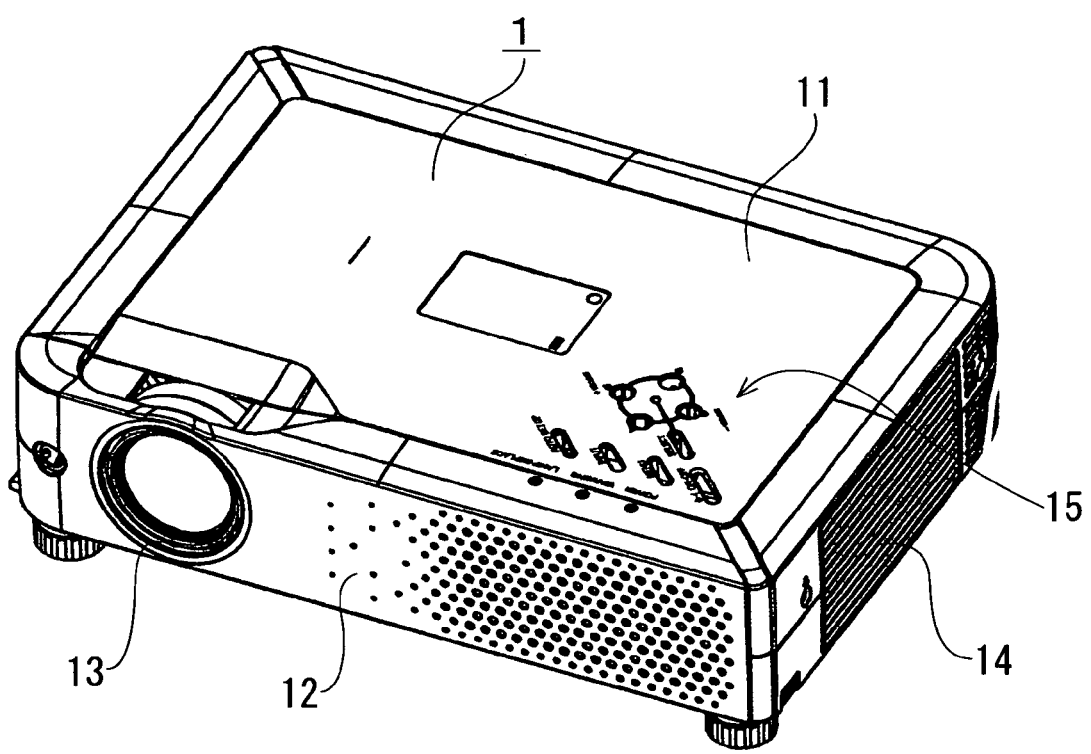
FIG. 1 is a perspective view of a liquid crystal projector device of the present invention.

As shown in FIG. 1, the liquid crystal projector device of the present invention includes a flat casing 1 including a lower half case 12 and an upper half case 11. A manipulation portion 15 including a plurality of manipulation buttons is disposed on a surface of the casing 1, while a projection window 13 is provided on the front face of the casing 1. A vent 14 for discharging the air in the casing 1 to the outside is provided on the right side wall of the casing 1.

Figure 2:
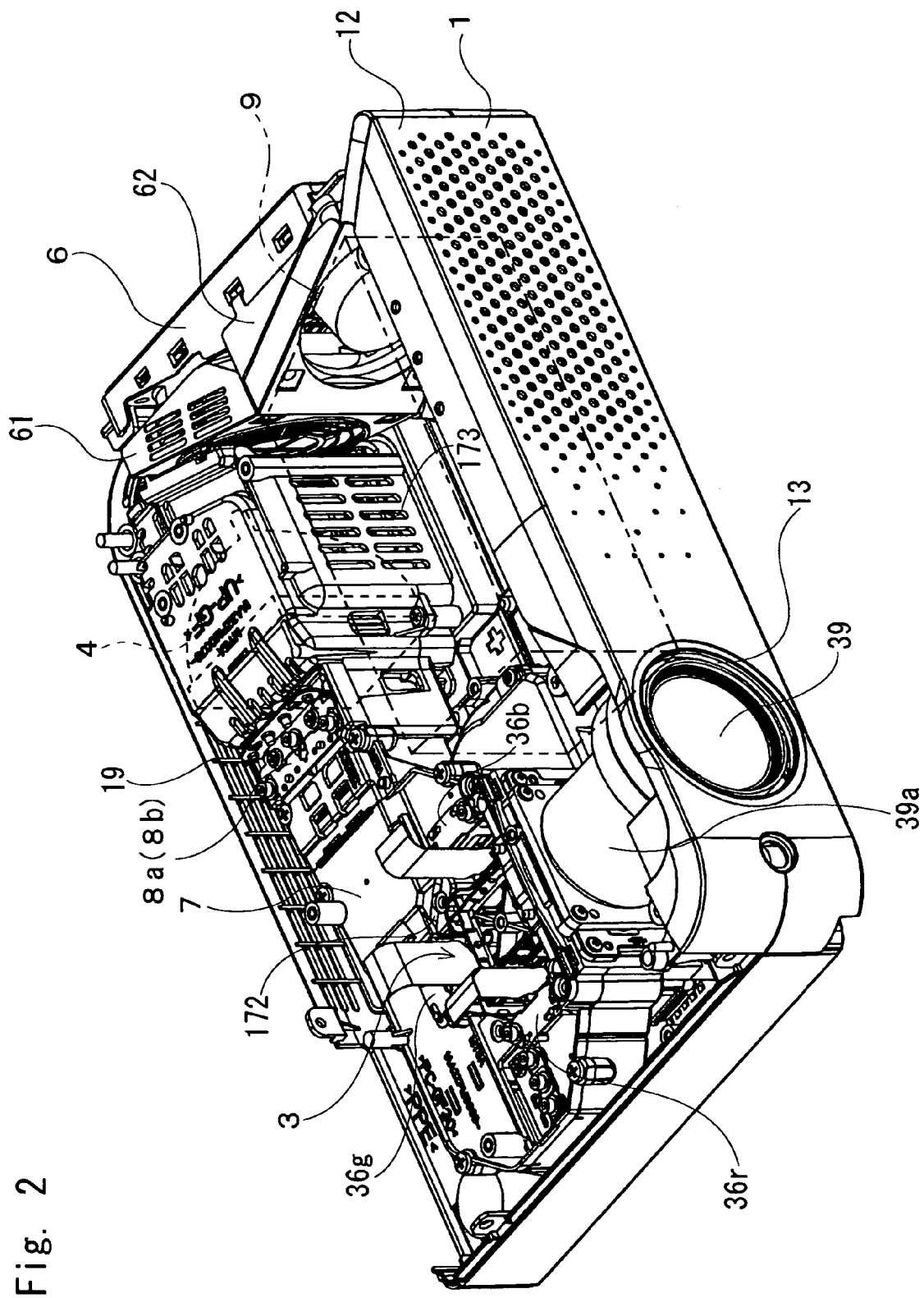
FIG. 2 is a perspective view showing the liquid crystal projector device with an upper half case thereof removed therefrom.
Figure 3:
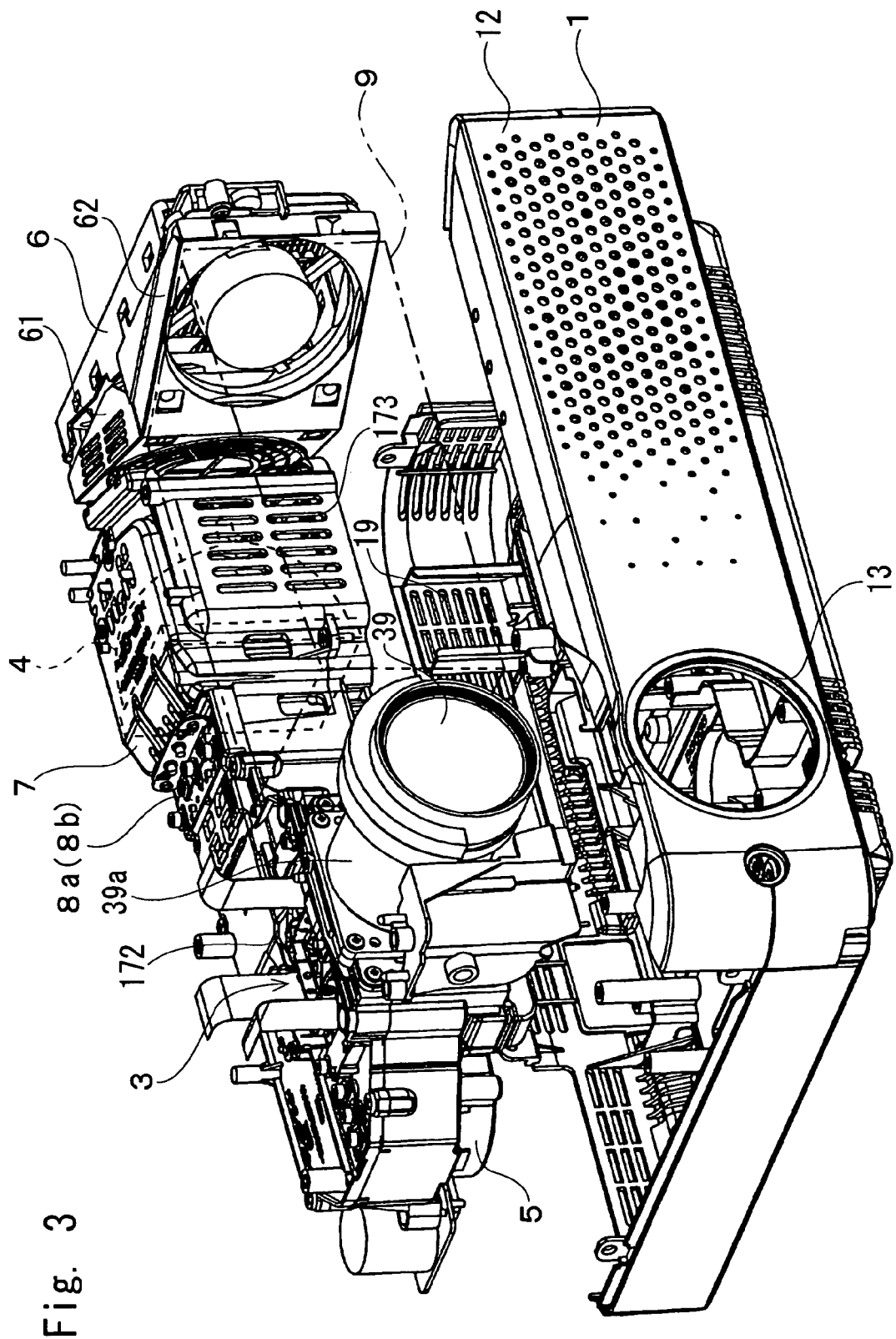
FIG. 3 is an exploded perspective view showing the liquid crystal projector device with the upper half case removed therefrom.

As shown in FIG. 2 and FIG. 3, a synthetic resin optical system holding case 7 extending in an approximate L-shape is disposed inside the casing 1. Disposed inside the optical system holding case 7 are a lamp unit 4 for serving as a light source, an optical system 2 (see FIG. 5) for separating white light emitted from the lamp unit 4 into light of three primary colors, and an image synthesizer 3 for irradiating liquid crystal panels for three primary colors with the light of three primary colors to generate image light of three primary colors, and synthesizing the generated image light of three primary colors into color image light. The lamp unit 4 is contained at the right end in the optical system holding case 7, while the image synthesizer 3 is contained at the forward end in the optical system holding case 7. The optical system 2 is disposed on a light path in the optical system holding case 7 from the lamp unit 4 to the image synthesizer 3.

The optical system holding case 7 has a forward end edge thereof coupled to the base end of a cylinder 39a for holding a projection lens 39. Further, a power unit 9 is placed inside the casing 1 at the forward side of the optical system holding case 7.

As shown in FIG. 2, an exhaust system 6 including a first exhaust fan 61 and a second exhaust fan 62 is attached to the right side wall of the lower half case 12. The first exhaust fan 61 is placed with an inlet direction thereof toward the lamp unit 4, while the second exhaust fan 62 is placed with an inlet direction thereof toward the power unit 9.

Figure 4:
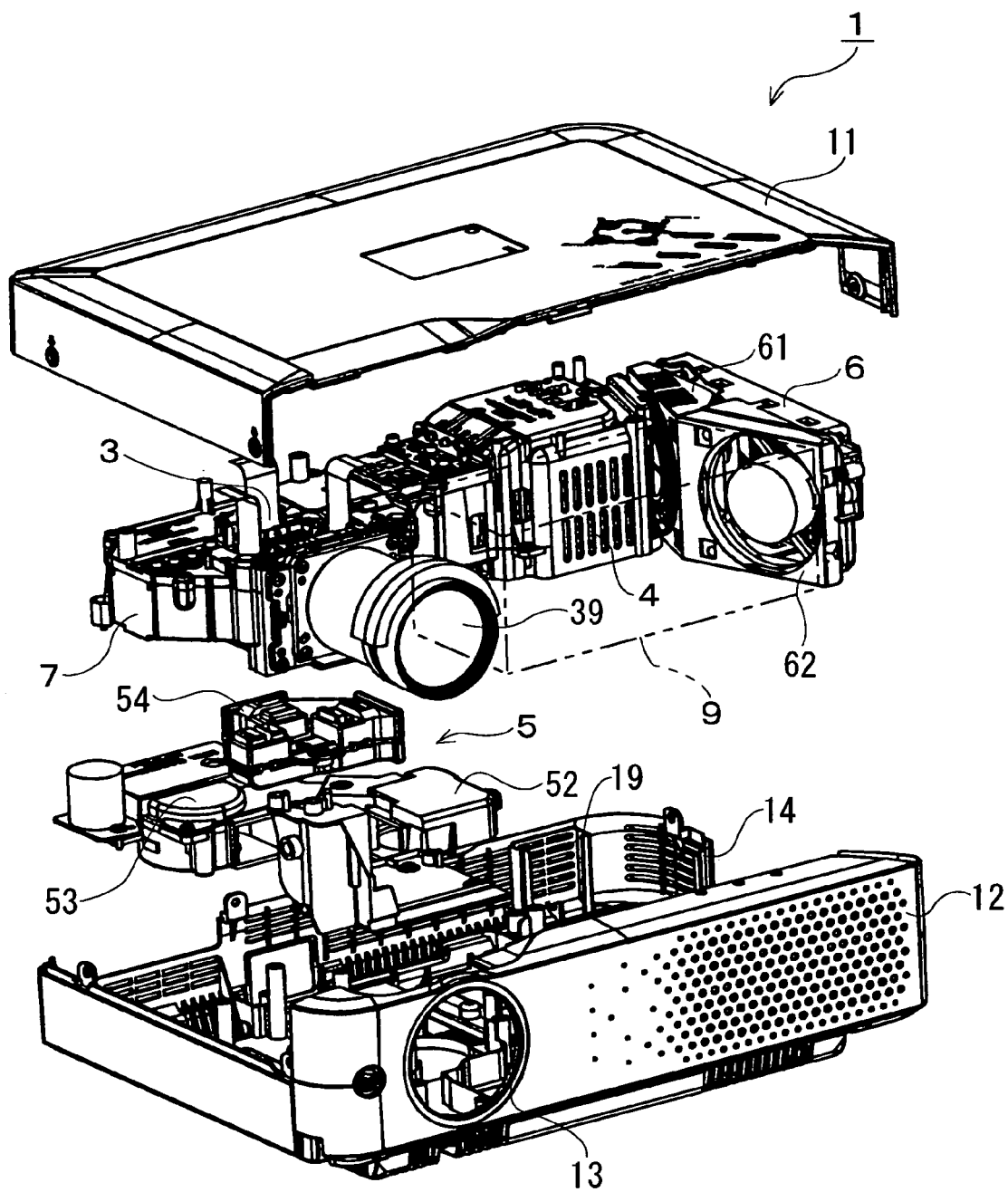
FIG. 4 is an exploded perspective view of the liquid crystal projector device.

As shown in FIG. 4, a cooling unit 5 for cooling the image synthesizer 3 is disposed below the image synthesizer 3. The cooling unit 5 includes a first fan 52 and a second fan 53. Bottom inlet windows (not shown) are respectively provided on the bottom wall of the lower half case 12 for mounting the first fan 52 and the second fan 53 thereon. Air from both cooling fans 52, 53 is blown to the image synthesizer 3 through a channel formed in a housing 54 of the cooling unit 5.

The liquid crystal projector device of the present invention will be described below in detail in construction.

Optical System 2

Figure 5:
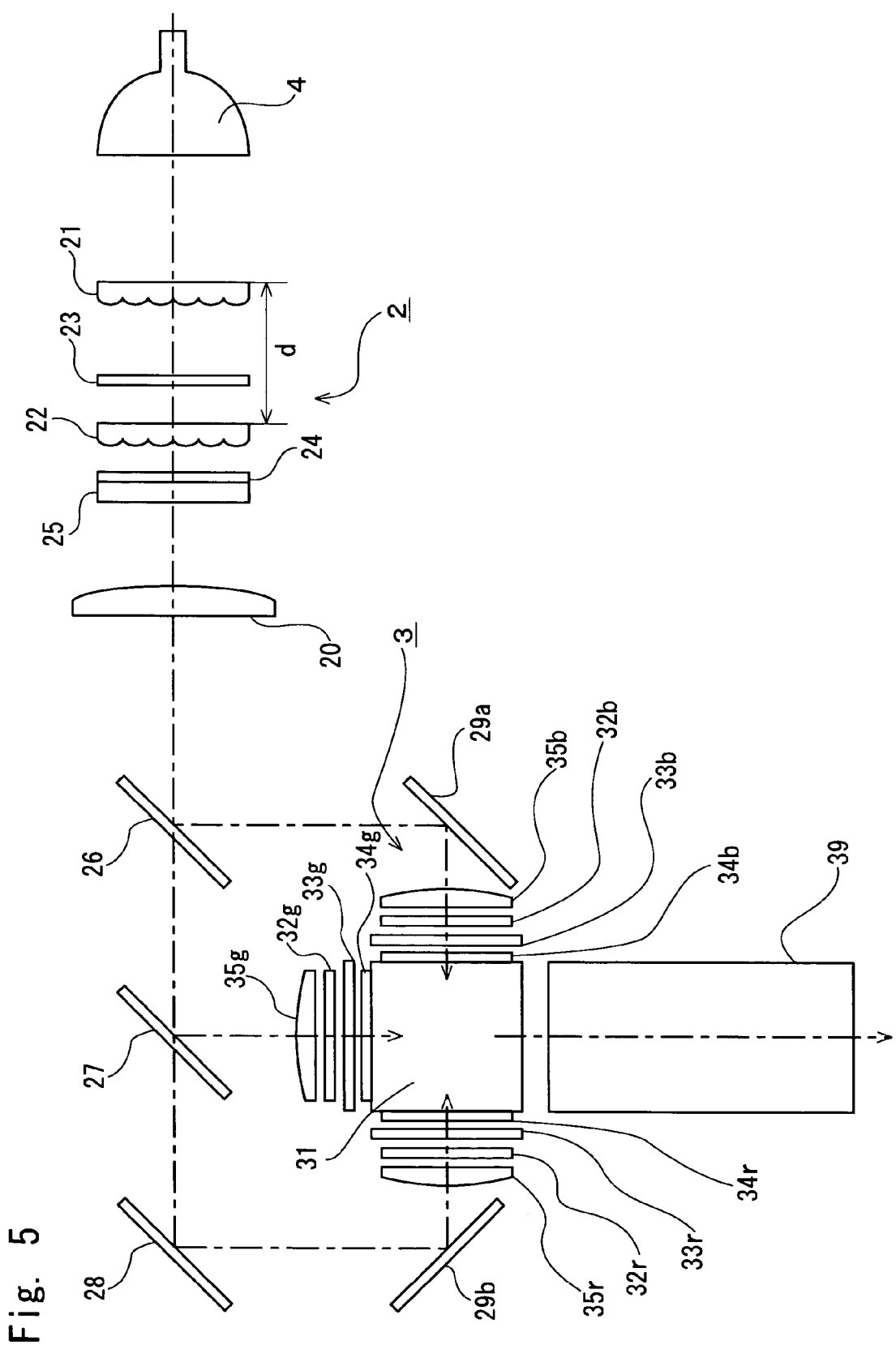
FIG. 5 illustrates an optical system of the liquid crystal projector device.

As shown in FIG. 5, white light from the lamp unit 4 is guided through a first integrator lens 21, a former stage slit plate 23, a second integrator lens 22, a latter stage slit plate 24, a polarization beam splitter 25 and a field lens 20 to a first dichroic mirror 26.

The first integrator lens 21 and the second integrator lens 22 are made of a heat resistance glass fly-eye lens, and have a function of uniformizing illuminance distribution of the white light emitted from the lamp unit 4. The former stage slit plate 23 and the latter stage slit plate 24 are made of an aluminum thin plate, and have a function of blocking unnecessary incident light toward the polarization beam splitter 25.

Figure 6:
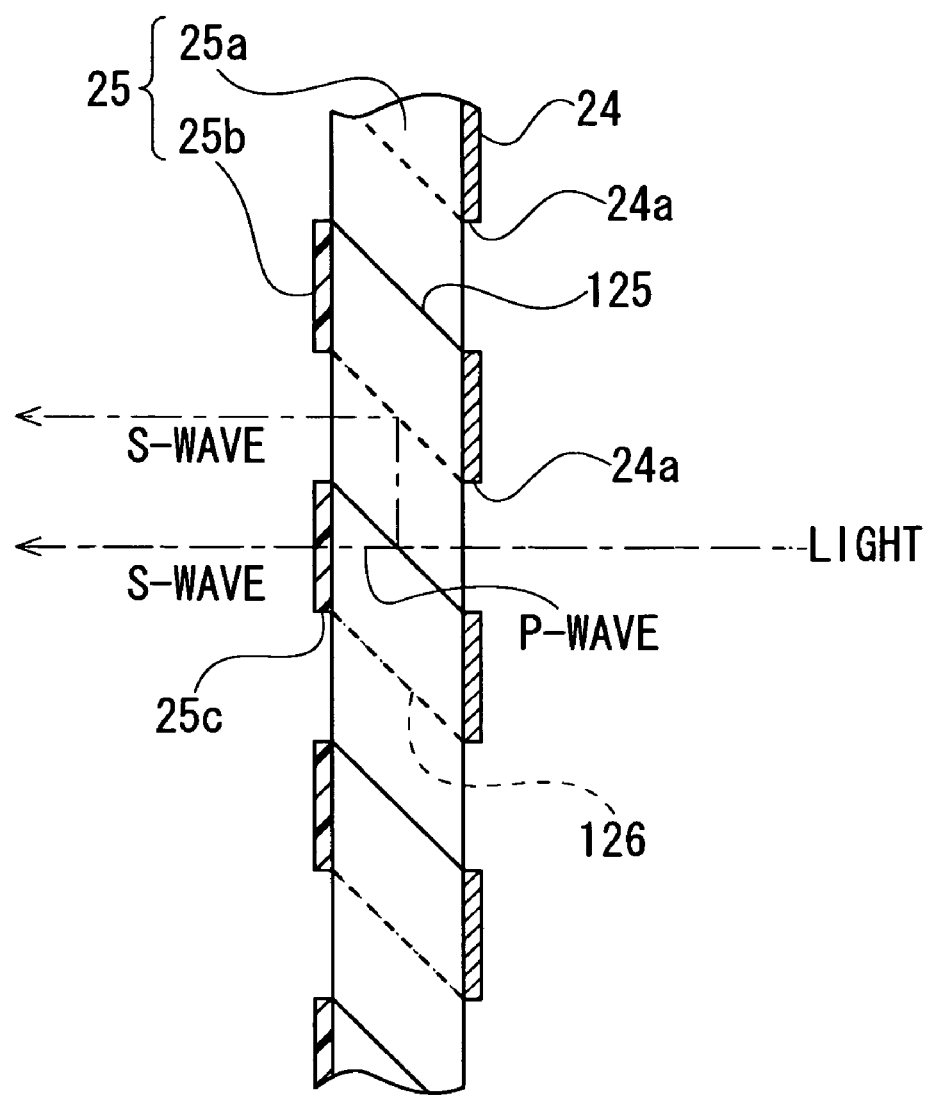
FIG. 6 is a sectional view of a latter stage slit plate and a polarization beam splitter.

As shown in FIG. 6, the polarization beam splitter 25 includes a polarizing plate 25a and a half-wavelength plate 25b with slits joined to a light emergence surface thereof. The latter stage slit plate 24 is attached in close contact with a light incidence surface of the polarizing plate 25a.

Inside the polarizing plate 25a, first interfaces 125 for passing therethrough a P-wave of light incident on the polarizing plate 25a and reflecting an S-wave, and second interfaces 126 for reflecting forward the S-wave reflected by the first interfaces 125 are alternately formed with an inclination angle of 45 degrees relative to the surface of the polarizing plate 25a. Each slit 24a of the latter stage slit plate 24 is provided in a position that allows light incidence on each of the first interfaces 125, but light incidence on the second interfaces 126 is prevented by the latter stage slit plate 24.

The P-wave of the light incident on the first interfaces 125 passes through the first interfaces 125 to reach the half-wavelength plate 25b. The P-wave has a phase thereof inversed by further passing through the half-wavelength plate 25b, and emerges as an S-wave. On the other hand, the S-wave reflected by the first interfaces 125 reaches the second interfaces 126, and is reflected by the second interfaces 126 to emerge from each slit 25c of the half-wavelength plate 25b. Thus, only the S-waves emerge from the polarization beam splitter 25.

As shown in FIG. 5, the light having passed through the polarization beam splitter 25 reaches through the field lens 20 to the first dichroic mirror 26. The first dichroic mirror 26 has a function of reflecting only a blue component of light and passing red and green components therethrough. A second dichroic mirror 27 has a function of reflecting the green component of light and passing the red component therethrough, and a field mirror 28 has a function of reflecting the red component. Thus, the white light emitted from the lamp unit 4 is separated by the first and second dichroic mirrors 26, 27 into blue light, green light and red light, and guided to the image synthesizer 3.

An optical system of the conventional liquid crystal projector device fails to include the former stage slit plate 23 included in the optical system 2 of the liquid crystal projector device of the present invention shown in FIG. 2.

FIG. 6 illustrates the polarization beam splitter 25 of the present invention. Because a polarization beam splitter 25 of the conventional liquid crystal projector device has the same configuration, the conventional liquid crystal projector device will be described with reference to the same drawing.

Because the polarization function of the polarization beam splitter 25 is insufficiently performed if light is incident on the second interfaces 126 of the polarization beam splitter 25, the latter stage slit plate 24 is placed in contact with a light incidence surface of the polarization beam splitter 25, or in a position close to the surface, in order to maintain relative position accuracy between the first interfaces 125 of the polarization beam splitter 25 and respective slits 24a of the latter stage slit plate 24.

The polarization beam splitter 25 significantly degrades the polarization function upon exceeding a limit temperature, and therefore needs to be used in a range within the limit temperature. However, heat is transmitted to the polarization beam splitter 25 from the latter stage slit plate 24, which could have a high temperature upon receipt of light from the lamp unit 4, because the latter stage slit plate 24 is placed in contact with the light incidence surface of the polarization beam splitter 25, or in a position close to the surface. This has caused a problem of the polarization beam splitter 25 having a high temperature exceeding a limit temperature.

Figure 7:
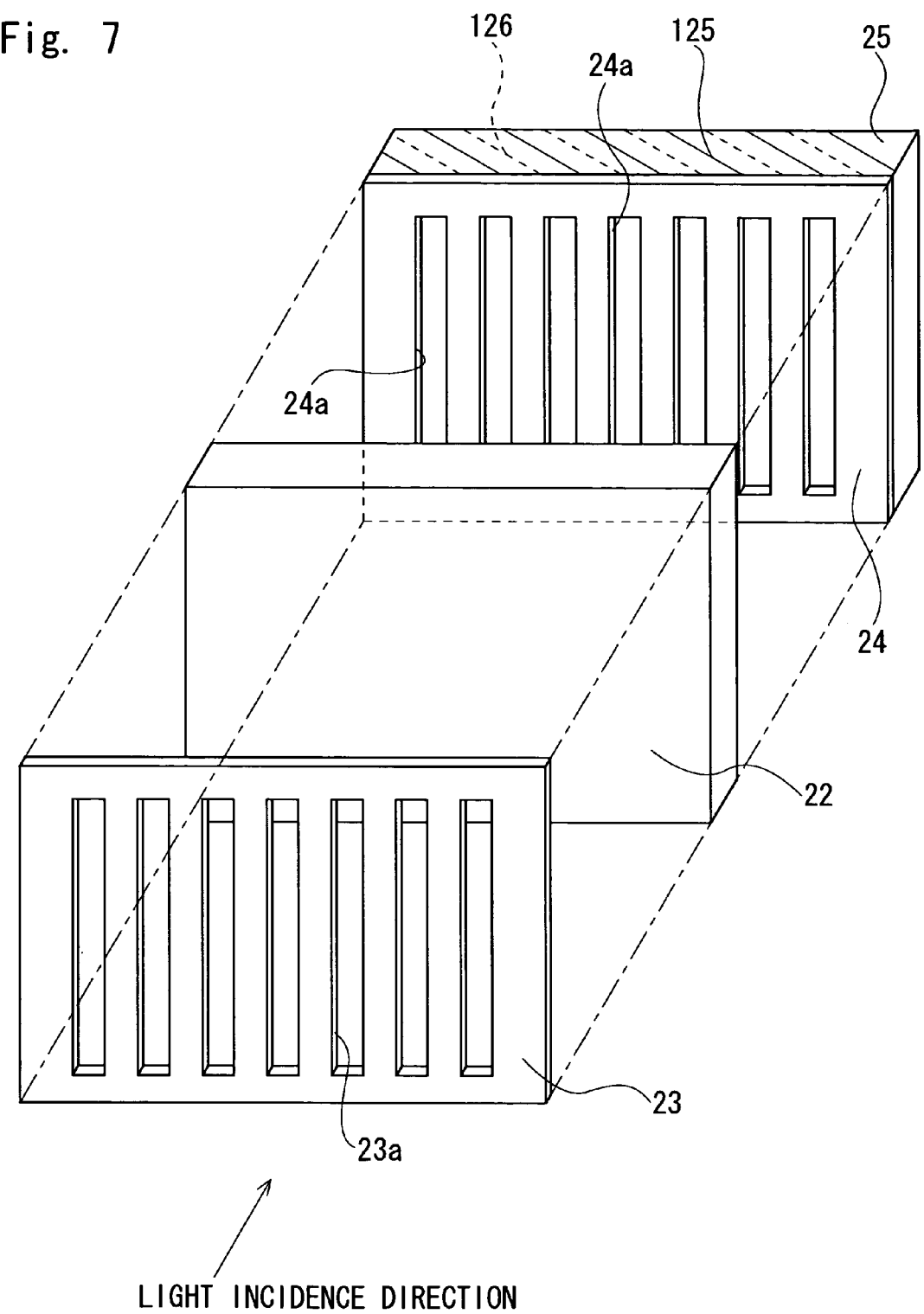
FIG. 7 is a perspective view showing a former stage slit plate, a second integrator lens, the latter stage slit plate and the polarization beam splitter.

In contrast, with the liquid crystal projector device of the present invention, the former stage slit plate 23 is arranged as shown in FIG. 7 on the light path of the optical system 2 in a position spaced apart from the latter stage slit plate 24 toward the lamp unit 4, and a plurality of slits 23a are provided in the former stage slit plate 23 at a plurality of locations overlapping in the optical axis direction with the respective slits 24a of the latter stage slit plate 24. Therefore, unnecessary incident light toward the polarization beam splitter 25 is largely blocked by the former stage slit plate 23. This allows the latter stage slit plate 24 to receive a less amount of unnecessary light than conventional one, resulting in prevention of the latter stage slit plate 24 having a high temperature exceeding a limit temperature.

Although the former stage slit plate 23 may have a high temperature upon receipt of light from the lamp unit 4, only slight heat is transmitted from the former stage slit plate 23 to the polarization beam splitter 25, not only because the former stage slit plate 23 is placed in a position spaced apart from the polarization beam splitter 25, but also because the heat resistant glass second integrator lens 22 with a low coefficient of thermal conductivity intervenes between the former stage slit plate 23 and the polarization beam splitter 25.

Therefore, according to the optical system 2 of the liquid crystal projector device of the present invention, temperature rise of the polarization beam splitter 25 can be suppressed to the minimum. Consequently, the polarization beam splitter 25 is prevented from having a high temperature exceeding a limit temperature.

Image Synthesizer 3

Figure 8:
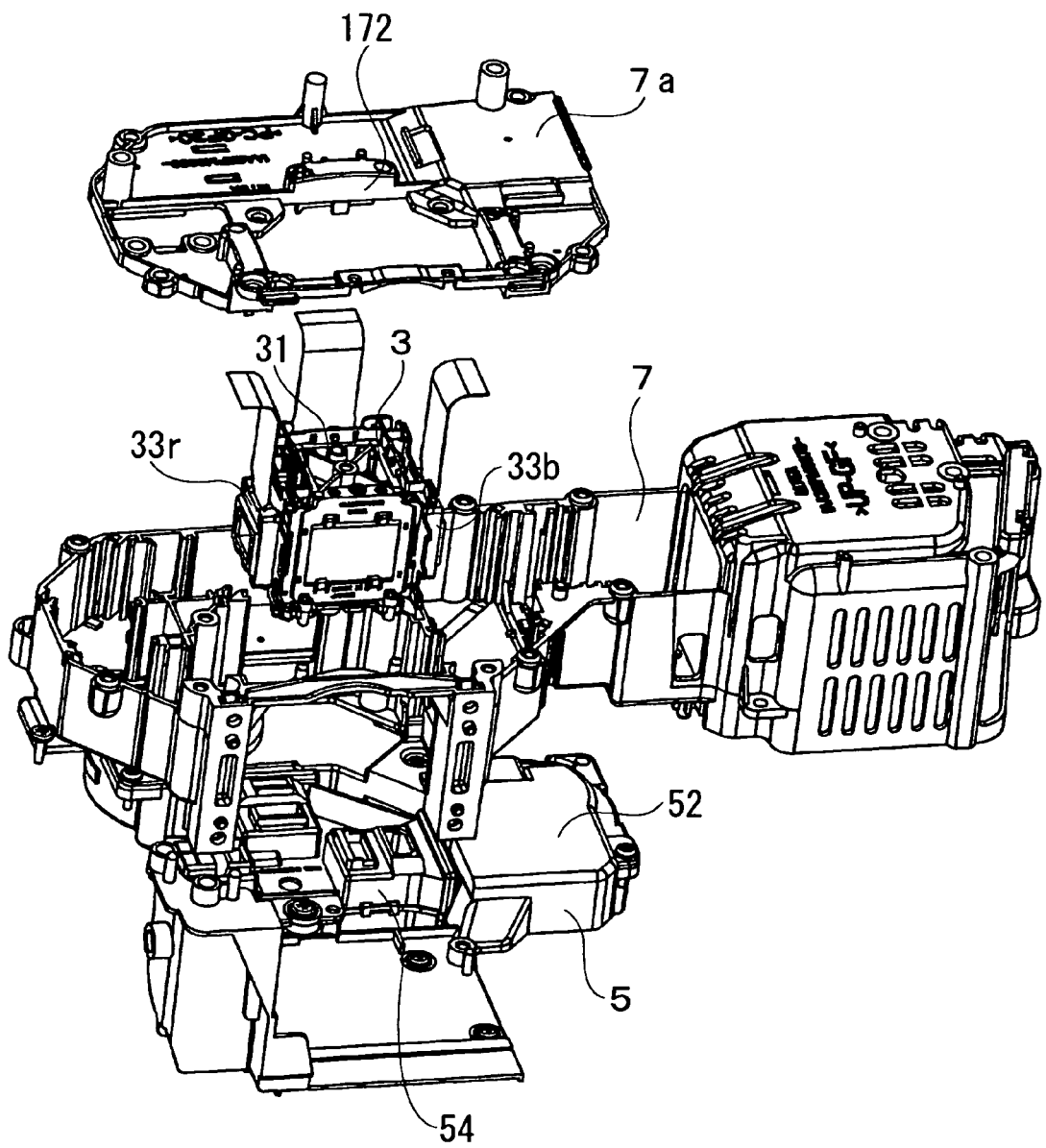
FIG. 8 is an exploded perspective view of an optical system holding case, a light synthesizer and a cooling unit.
Figure 9:
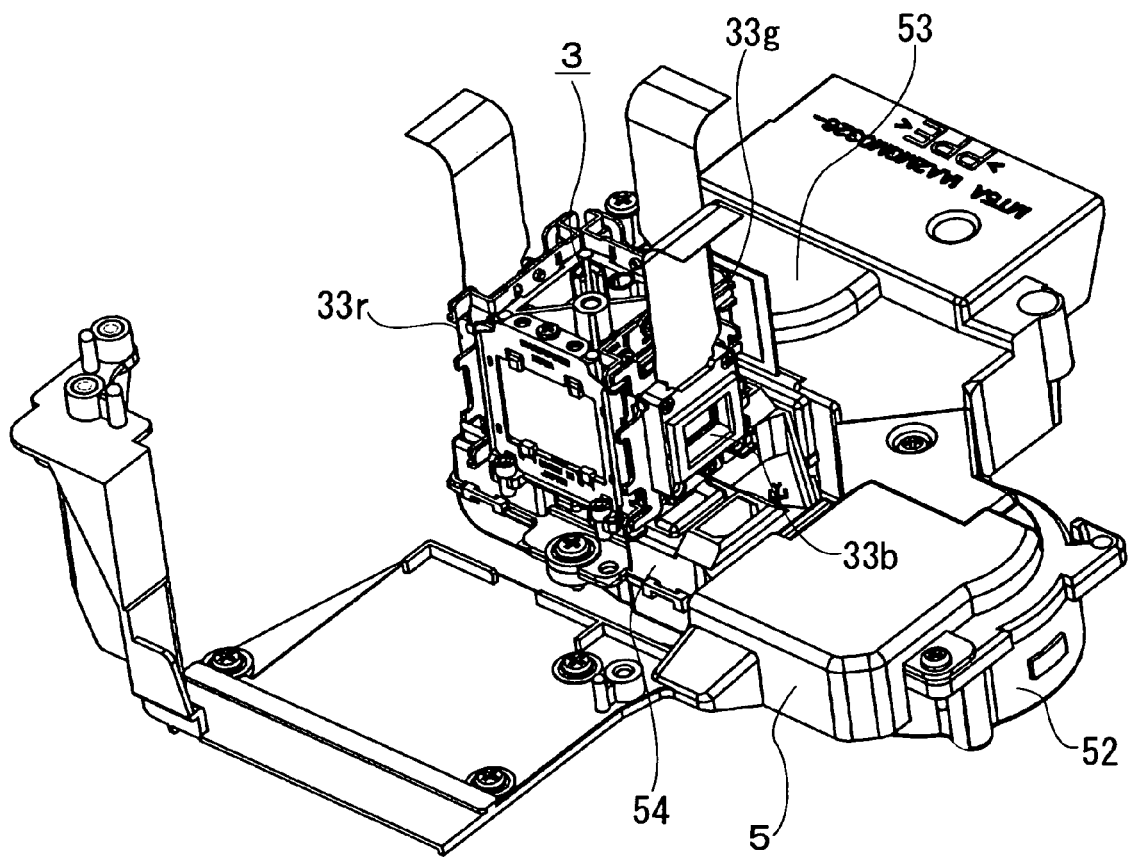
FIG. 9 is an exploded perspective view of the light synthesizer and the cooling unit.

As shown in FIG. 8 and FIG. 9, the image synthesizer 3 includes a liquid crystal panel for blue 33b, a liquid crystal panel for green 33g and a liquid crystal panel for red 33r, which are attached to three side faces of a cube-like color synthesis prism 31, respectively.

As shown in FIG. 8, the image synthesizer 3 is contained in the optical system holding case 7 through an opening 172 provided in a lid 7a of the optical system holding case 7.

As shown in FIG. 2, incidence polarizing plate holders 36b, 36g, 36r are attached to light incidence sides of the three liquid crystal panels 33b, 33g, 33r, respectively. The incidence polarizing plate holders 36b, 36g, 36r hold three incidence polarizing plates 32b, 32g, 32r described later.

The blue light reflected by the first dichroic mirror 26 and a field mirror 29a shown in FIG. 5 is guided by a field lens 35b through the field lens 35b, the incidence polarizing plate for blue 32b, the liquid crystal panel for blue 33b and an emergence polarizing plate for blue 34b to the color synthesis prism 31.

The green light reflected by the second dichroic mirror 27 is guided by a field lens 35g through the field lens 35g, the incidence polarizing plate for green 32g, the liquid crystal panel for green 33g and an emergence polarizing plate for green 34g to the color synthesis prism 31.

Similarly, the red light reflected by two field mirrors 28, 29b is guided by a field lens 35r of the image synthesizer 3 through the field lens 35r, the incidence polarizing plate for red 32r, the liquid crystal panel for red 33r and an emergence polarizing plate for red 34r to the color synthesis prism 31.

The image light of the three colors guided to the color synthesis prism 31 is synthesized by the color synthesis prism 31, and the resulting color image light is to be magnifyingly projected through the projection lens 39 on a forward screen.

Figure 10:
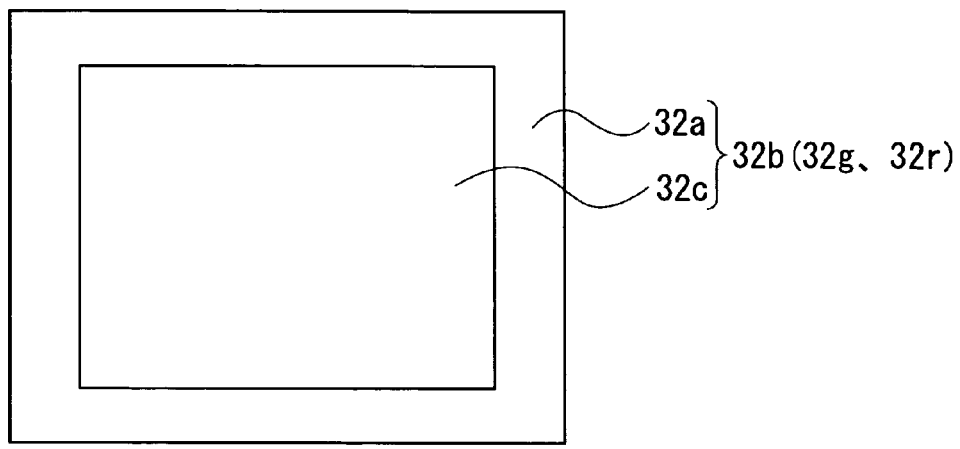
FIG. 10 is a front view showing an incidence side polarizing plate.

As shown in FIG. 10, the incidence polarizing plate for blue 32b, the incidence polarizing plate for green 32g and the incidence polarizing plate for red 32r each include a glass base material 32a made of sapphire glass and a synthetic resin polarizing film 32c joined to a surface thereof. Each of the incidence polarizing plates 32b, 32g, 32r will generate heat upon receipt of light. Because the polarization function significantly degrades if the temperature of the polarizing film 32c exceeds a limit temperature, the cooling unit 5 shown in FIG. 8 and FIG. 9 blows outside air to thereby cool each of the incidence polarizing plates 32b, 32g, 32r.

However, it is necessary in the conventional liquid crystal projector device to rotate cooling fans of the cooling unit 5 at a high speed in order to keep the temperature of the polarizing film 32c within a limit temperature. This has resulted in a problem of increased noise occurring from the cooling unit 5.

Accordingly, in order to attempt to lower the temperature of each of the incidence polarizing plates 32b, 32g, 32r by enlarging the area of the glass base material 32a, i.e. the heat dissipation area, an experiment was conducted where a plurality of kinds of incidence polarizing plates for green 32g with a constant area of the polarizing film 32c but different areas of the glass base material 32a were prepared, and each of the plurality of kinds of incidence polarizing plates for green 32g is attached to the liquid crystal projector device for measurement of the temperature of the polarizing film 32c in use. The polarizing film 32c is of a size of 20.8 mm×16.3 mm, and the room temperature is 27° C. Table 1 given below and FIG. 11 show the experimental result.

TABLE 1

| Size of Glass Base Material [mm × mm] | Area Ratio of Glass Base Material to Polarizing Film [%] | Temperature of Polarizing Film [° C.] |
|---|---|---|
| 30.0 × 24.0 | 224 | 61.4 |
| 27.8 × 21.8 | 178 | 61.6 |
| 26.8 × 20.8 | 163 | 63.2 |
| 26.3 × 20.3 | 157 | 64.2 |
| 25.8 × 19.8 | 150 | 63.5 |
| 24.8 × 18.8 | 137 | 65.0 |

Figure 11:
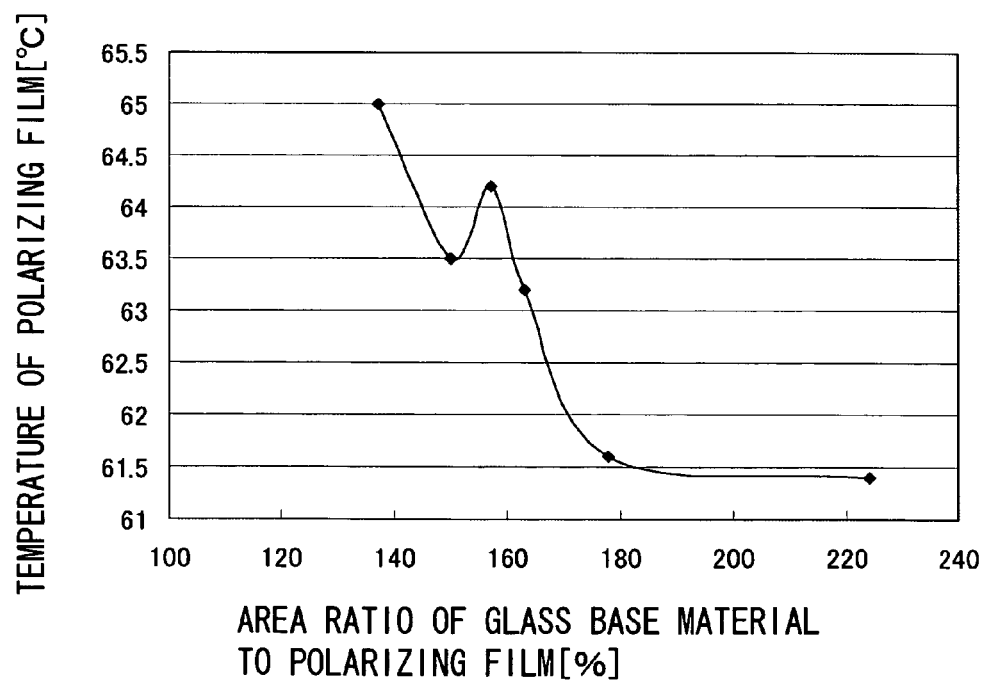
FIG. 11 is a graph representing a relationship between an area ratio of a glass to the polarizing plate and a polarizing plate temperature.

FIG. 11 reveals that the temperature of the polarizing film 32c is stable at relatively low temperatures when the area ratio of the glass base material 32a to the polarizing film 32c is set to 178% or more. On the other hand, it is understood that temperature rise of the polarizing film 32c is significant when the area ratio is set to 150% or less.

Further, it is understood that temperature variations of the polarizing film 32c relative to the area ratio are unstable when the area ratio is set to 150%-178%. This is probably because the amount of heat transmission from the polarizing film 32c to the glass base material 32a approximately balances with the amount of heat dissipation from the glass base material 32a. Therefore, the magnitude relation of both could be reversed by slight variation of the heat transmission amount and/or heat dissipation amount due to certain factors. This renders unstable the temperature variations of the polarizing film 32c relative to the area ratio.

Considering the above experimental result, the reason why the temperature rise of the polarizing film 32c is significant when the area ratio is set to 150% or less is probably that the amount of heat dissipation from the glass base material 32a is smaller than the amount of heat transmission from the polarizing film 32c to the glass base material 32a.

Heat of the polarizing film 32c is first transmitted to a central area of the glass base material 32a having the polarizing film 32c joined thereto, and then gradually transmitted from the central area to a surrounding peripheral area. However, because the glass base material 32a has a low coefficient of thermal conductivity, even if heat is generated in the polarizing film 32c, there is little temperature rise in the peripheral area, which is in a certain distance away from the central area of the glass base material 32a. This allows only a slight amount of heat dissipation from the peripheral area.

Therefore, the reason why the polarizing film 32c has an approximately constant temperature when the area ratio is set to 178% or more is probably that enlargement of the surface area of the glass base material 32a fails to lead to enlargement of the heat dissipation area.

Accordingly, based on the above experimental result, the area ratio of the glass base material 32a to the polarizing film 32c is set to 178%, where the temperature of the polarizing film 32c is stable at relatively low temperatures, with the glass base material 32a having a minimum surface area. The size of the polarizing film 32c of the incidence polarizing plate for blue 32b, the incidence polarizing plate for green 32g and the incidence polarizing plate for red 32r is set to 20.8 mm×16.3 mm, with the size of the glass base material 32a being 27.8 mm×21.8 mm.

This allows cooling fans of the cooling unit 5 to have reduced revolutions, resulting in reduced noise occurring from the cooling unit 5.

Optical System Holding Case 7

Figure 12:
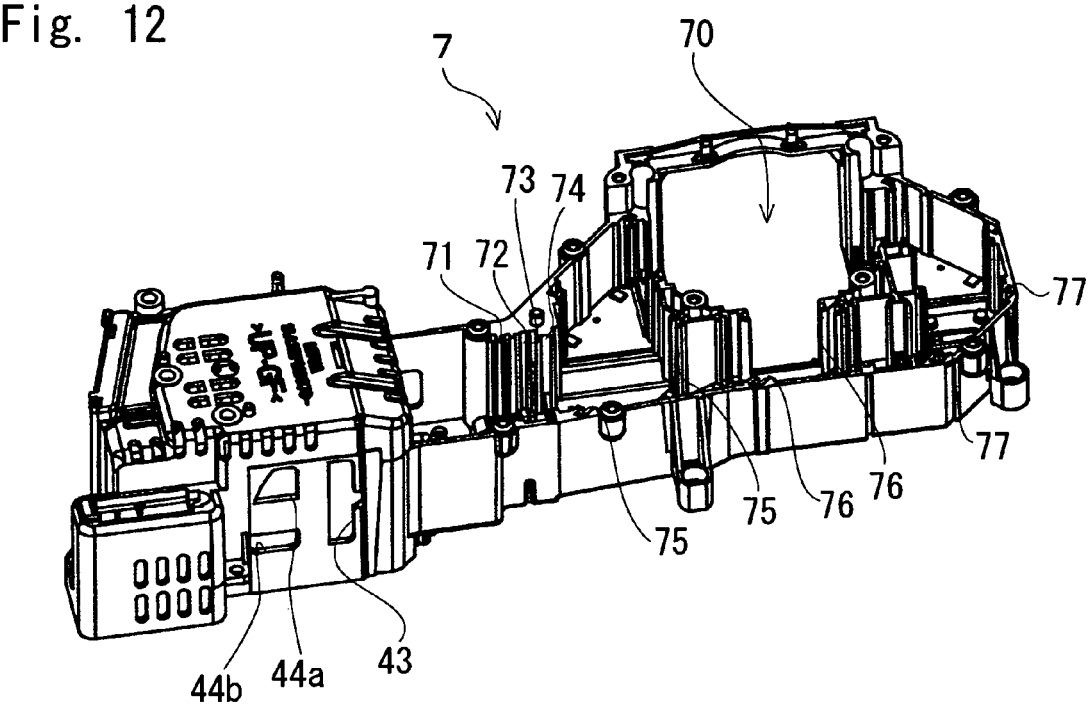
FIG. 12 is a perspective view of the optical system holding case.
Figure 13:
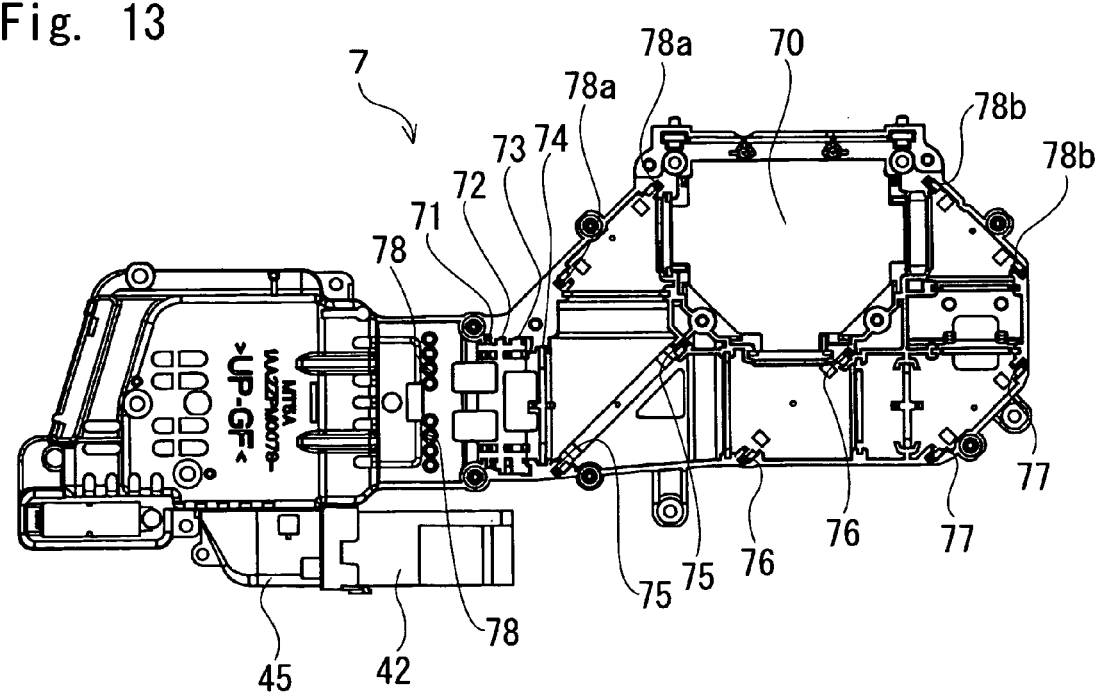
FIG. 13 is a plan view of the optical system holding case.

The former stage slit plate 23, the second integrator lens 22, the latter stage slit plate 24, the polarization beam splitter 25, the field lens 20, the first and second dichroic mirrors 26, 27 and the three field mirrors 28, 29a, 29b, which constitute the optical system 2 shown in FIG. 5 are placed in the optical system holding case 7 made of a synthetic resin integral mold shown in FIG. 12 and FIG. 13. The lamp unit 4 is contained at the right end in the optical system holding case 7, while a space 70 is formed at the forward end of the optical system holding case 7. The above described image synthesizer 3 is to be placed inside the space 70.

The optical system holding case 7 has both walls along the light path from the lamp unit 4 to the image synthesizer 3, which are formed with a first setting groove 71 for setting therein the former stage slit plate 23 shown in FIG. 5, a second setting groove 72 for setting the second integrator lens 22 therein, a third setting groove 73 for setting therein the latter stage slit plate 24 and the polarization beam splitter 25 together, a fourth setting groove 74 for setting the field lens 20 therein, fifth and sixth setting grooves 75, 76 for setting therein the first and second dichroic mirrors 26, 27, respectively, and seventh to ninth setting grooves 77, 78a, 78b for setting therein the three field mirrors 28, 29a, 29b, respectively.

Figure 14:
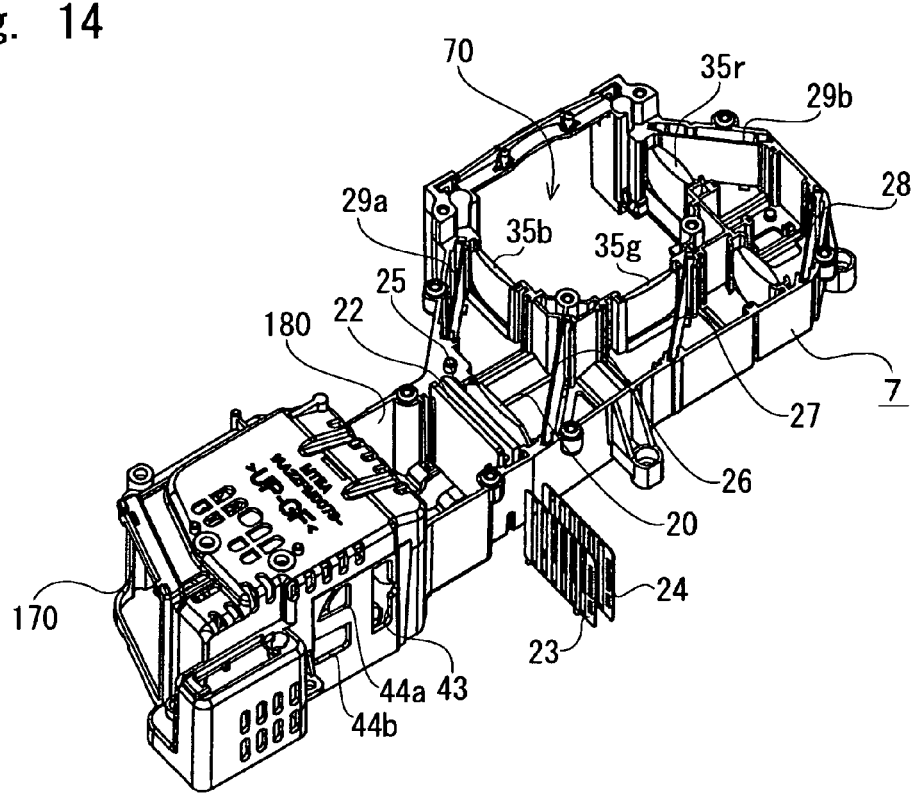
FIG. 14 is an exploded perspective view showing the optical system holding case having optical components placed therein with the former stage and latter stage slit plates removed therefrom.
Figure 15:
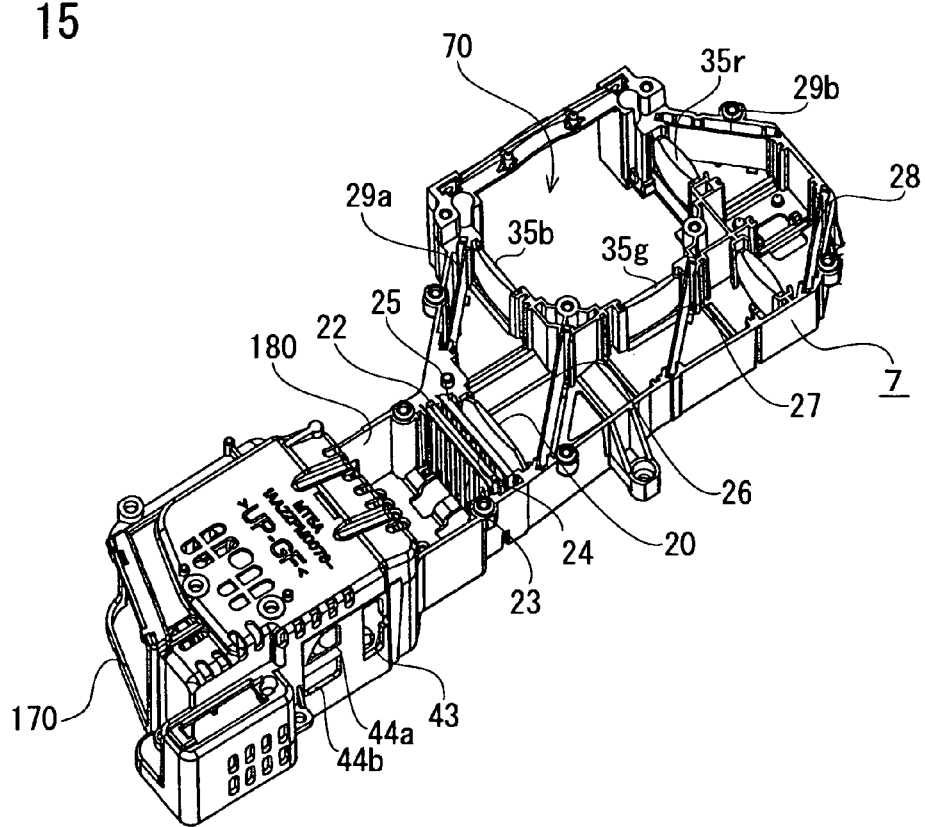
FIG. 15 is a perspective view showing the optical system holding case having optical components placed therein.

FIG. 14 and FIG. 15 show the former stage slit plate 23, the second integrator lens 22, the latter stage slit plate 24, the polarization beam splitter 25, the field lens 20, the first and second dichroic mirrors 26, 27 and the three field mirrors 28, 29a, 29b, which constitute the optical system 2, being set in the setting grooves 71-78b, respectively.

The liquid crystal projector device of the present invention is adapted to interchangeably use a liquid crystal panel with a diagonal length of 0.6 inch and a liquid crystal panel of 0.7 inch for the three liquid crystal panels 33r, 33g, 33b shown in FIG. 5.

A distance between the first integrator lens 21 and the second integrator lens 22 shown in FIG. 5 needs to be changed depending on the size of the liquid crystal panel to be used. With the conventional liquid crystal projector device, two grooves spaced apart from each other along the light path are formed on both walls of the optical system holding case, so that the first integrator lens 21 and the second integrator lens 22 are respectively held by the two grooves. However, in order to allow a plurality of kinds of liquid crystal panels different in size to be used, it is necessary to prepare a plurality of kinds of optical system holding cases different in distance between the two grooves. This has resulted in increased design time and production costs.

Figure 18A:
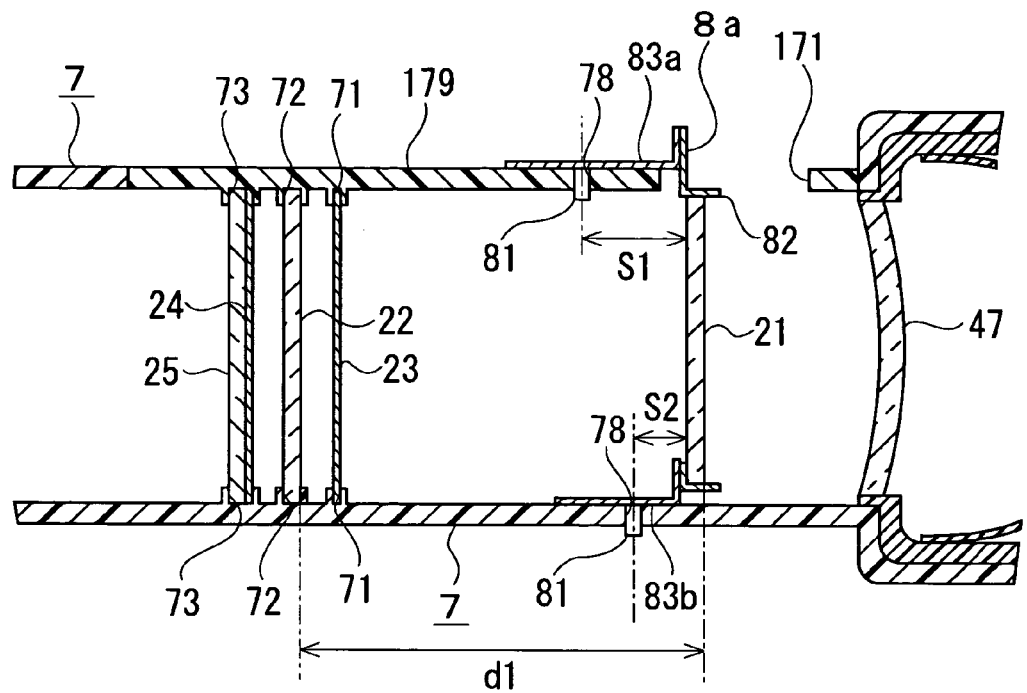
FIG. 18(a) and FIG. 18(b) are a sectional view showing the optical system holding case having a lens holder for 0.6 inch attached thereto and a lens holder for 0.7 inch attached thereto, respectively.
Figure 18B:
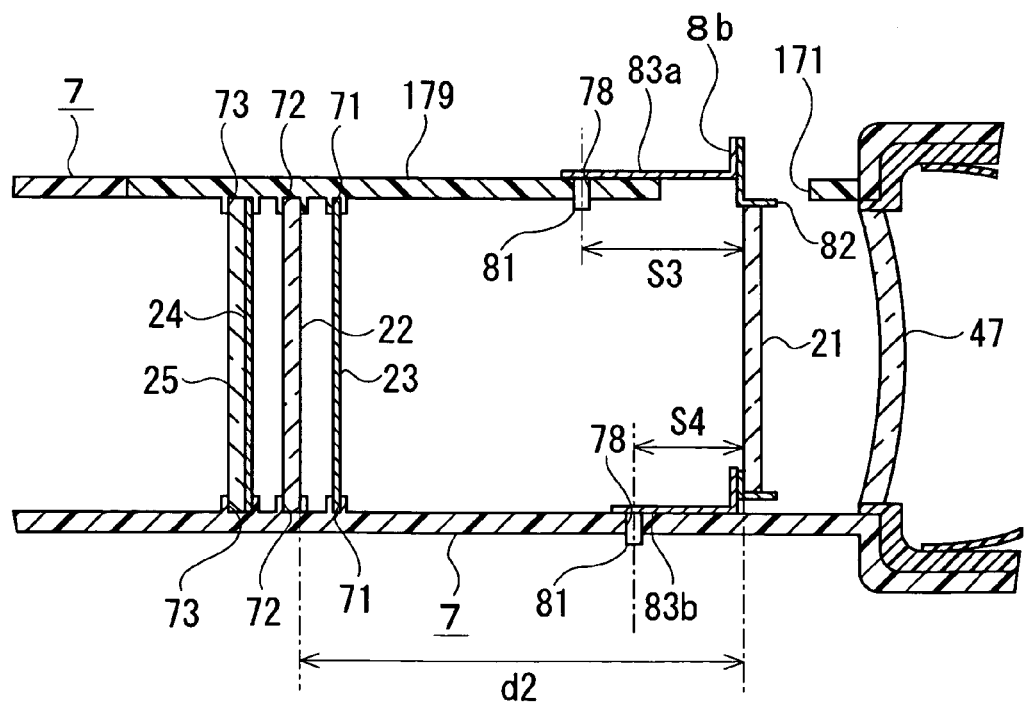

In contrast, the liquid crystal projector device of the present invention is so adapted that the optical system holding case 7 has interchangeably attached thereto two kinds of lens holders for holding the first integrator lens 21, namely, a lens holder for 0.6 inch 8a shown in FIG. 18(a) and a lens holder for 0.7 inch 8b shown in FIG. 18(b). Because the lens holder for 0.6 inch 8a and the lens holder for 0.7 inch 8b have the same configuration except that the position of a positioning pin described later is different, only the lens holder for 0.6 inch 8a will be described, and the lens holder for 0.7 inch 8b will not be described.

Figure 16:
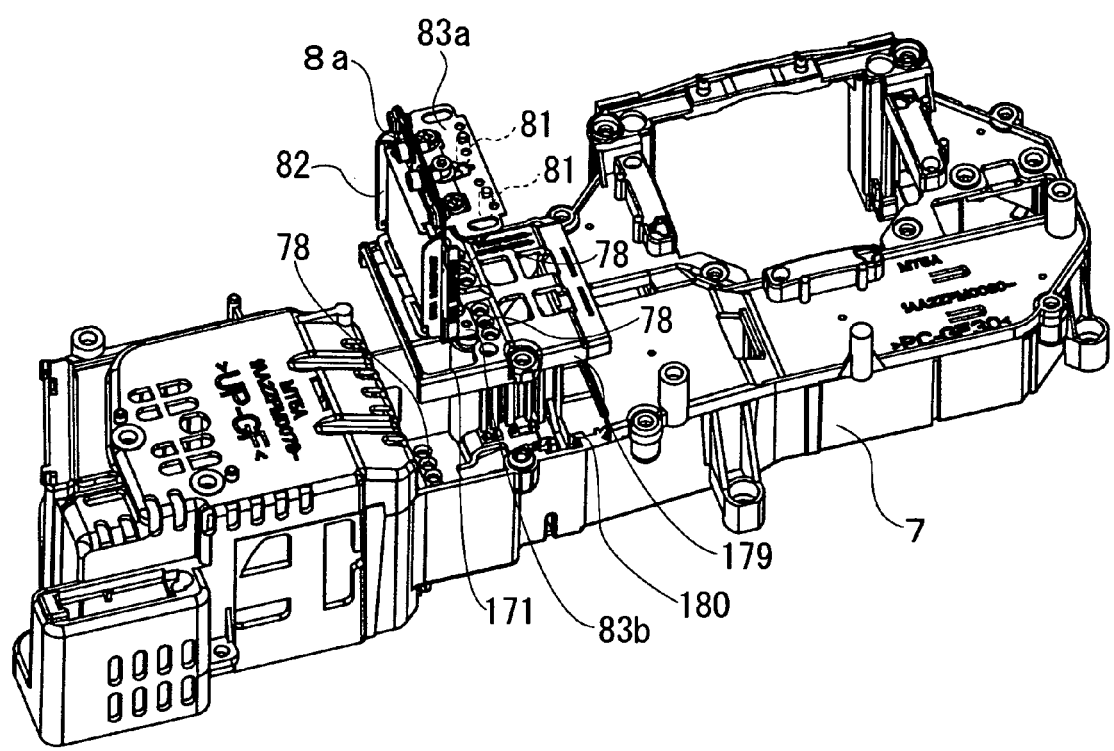
FIG. 16 is an exploded perspective view showing the optical system holding case and a first integrator lens holder.

As shown in FIG. 16, the lens holder for 0.6 inch 8a includes a plate metal rectangular frame 82 for holding the first integrator lens 21, and a pair of plate metal attachment plates 83a, 83b extending from the frame 82 along the upper face and lower face of the optical system holding case 7. A pair of positioning pins 81, 81 are protruded downwardly on each of the pair of attachment plates 83a, 83b.

As shown in FIG. 14 and FIG. 15, the upper wall of the optical system holding case 7 is provided with an insertion opening 180 for inserting therethrough the former stage slit plate 23, the second integrator lens 22, the latter stage slit plate 24, the polarization beam splitter 25 and the field lens 20.

As shown in FIG. 16, a top plate 179 for closing the insertion opening 180 is attached to the upper wall of the optical system holding case 7. The top plate 179 is provided with an opening 171 for inserting both lens holders 8a, 8b therethrough, and positioning holes 78, 78 for positioning both lens holders 8a, 8b. The positioning pins 81, 81 protruded on the upper attachment plate 83a for both lens holders 8a, 8b are to be fitted into the positioning holes 78, 78 of the top plate 179.

Similarly, the bottom wall of the optical system holding case 7 is also provided with positioning holes 78, 78. The positioning pins 81, 81 protruded on the lower attachment plate 83b are to be fitted into the positioning holes 78, 78.

Figure 17:
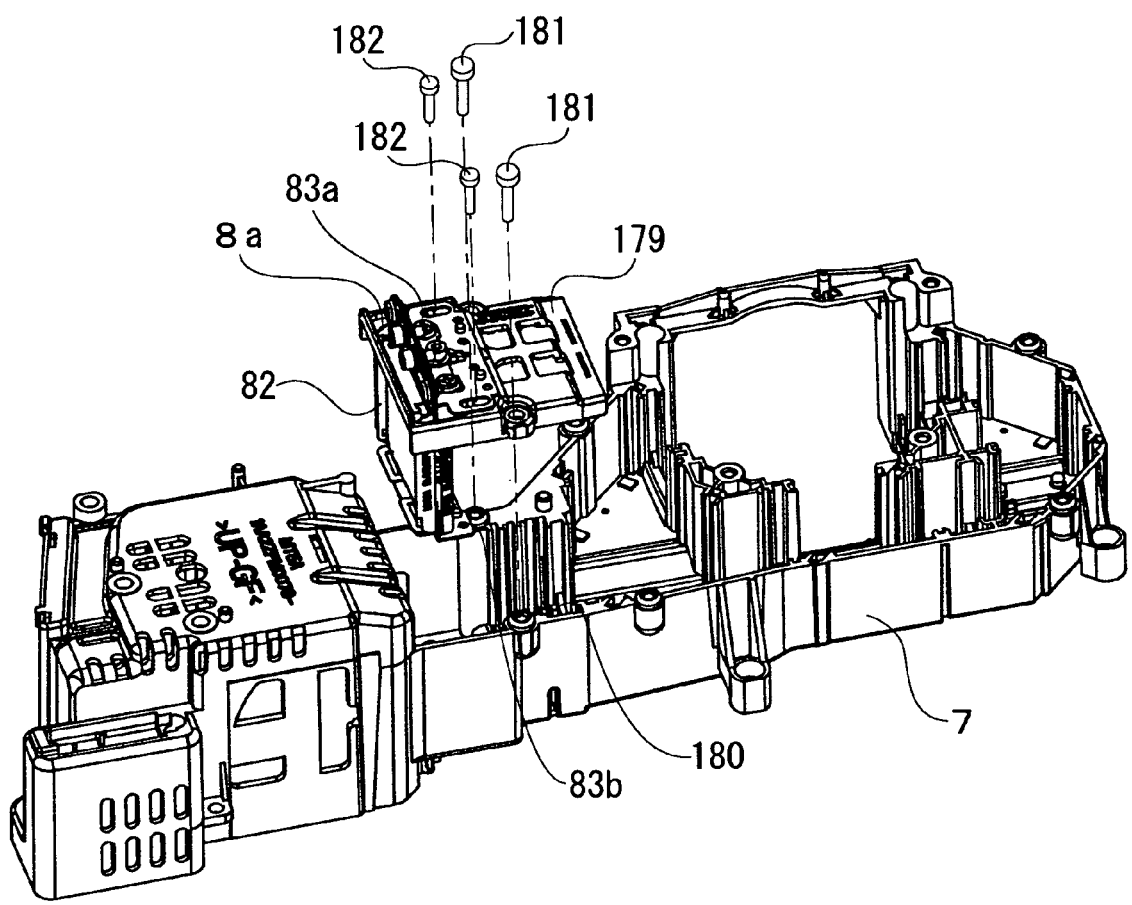
FIG. 17 is an exploded perspective view for illustrating a method for attaching the first integrator lens holder to the optical system holding case.

As shown in FIG. 17, each of both lens holders 8a, 8b is fixed to the top plate 179 by screws 182, 182 with the positioning pins 81, 81 protruded on the upper attachment plate 83a fitted into the positioning holes 78, 78 of the top plate 179. Then, the positioning pins 81, 81 protruded on the lower attachment plate 83b for both lens holders 8a, 8b are fitted into the positioning holes 78, 78 of the bottom wall of the optical system holding case 7, and thereafter the top plate 179 is fixed to the upper wall of the optical system holding case 7 by screws 181, 181 to thereby attach the first integrator lens 21 to a predetermined position on the light path.

The positioning pins 81, 81 of the holder for 0.7 inch 8b shown in FIG. 18(b) are protruded in positions spaced apart from the frame 82 more than the respective positioning pins 81, 81 of the holder for 0.6 inch 8a shown in FIG. 18(a). Distances S3 and S4 between both positioning pins 81, 81 of the holder for 0.7 inch 8b shown in FIG. 18(b) and the surface of the first integrator lens 21 attached to the frame 82 are thereby made greater than distances S1 and S2 between both positioning pins 81, 81 of the holder for 0.6 inch 8a shown in FIG. 18(a) and the surface of the first integrator lens 21 attached to the frame 82. Consequently, a distance d2 between the first integrator lens 21 and the second integrator lens 22 when the holder for 0.7 inch 8b is attached is larger than a distance d1 when the holder for 0.6 inch 8a is attached.

The above distance d1 is set to a distance suitable for a 0.6 inch liquid crystal panel, while the above distance d2 is set to a distance suitable for a 0.7 inch liquid crystal panel.

Therefore, according to the liquid crystal projector device of the present invention, a plurality of kinds of liquid crystal panels with different sizes can be used by only changing the lens holder for holding the first integrator lens 21 depending on the size of the liquid crystal panel. Consequently, it is unnecessary to prepare a plurality of kinds of optical system holding cases, so that design time is shortened and production costs are reduced more than conventionally.

Cooling Unit 5

As shown in FIG. 4, FIG. 8 and FIG. 9, the cooling unit 5 for cooling the image synthesizer 3 is placed below the image synthesizer 3.

With the conventional liquid crystal projector device, a cooling unit is provided with cooling fans respectively exclusively used for liquid crystal panels for red, green and blue constituting an image synthesizer, so that the three cooling fans cool the three liquid crystal panels.

As shown in FIG. 5, with light path lengths from the lamp unit 4 to the three liquid crystal panels 33b, 33g, 33r, a light path for blue to the liquid crystal panel for blue 33b and a light path for green to the liquid crystal panel for green 33g have the same length, while only a light path for red to the liquid crystal panel for red 33r is longer. The liquid crystal panel for red 33r receives light with the smallest intensity because the longer the light path is, the lower is intensity of light received by the three liquid crystal panels 33b, 33g, 33r.

Because the three liquid crystal panels 33b, 33g, 33r have various heat amounts depending on intensity of light received by the respective liquid crystal panels 33b, 33g, 33r, the liquid crystal panel for blue 33b has the greatest heat amount, and the liquid crystal panel for red 33r has the smallest heat amount.

Accordingly, attention has been focused on a difference between heat amounts of the three liquid crystal panels 33b, 33g, 33r caused by a difference between the light path lengths. The liquid crystal projector device of the present invention omits the cooling fan conventionally exclusively used for the liquid crystal panel for red 33r with the smallest heat amount out of the three cooling fans respectively provided for the liquid crystal panels for red, green and blue, and includes the cooling unit 5 consisting of two cooling fans.

Figure 19:
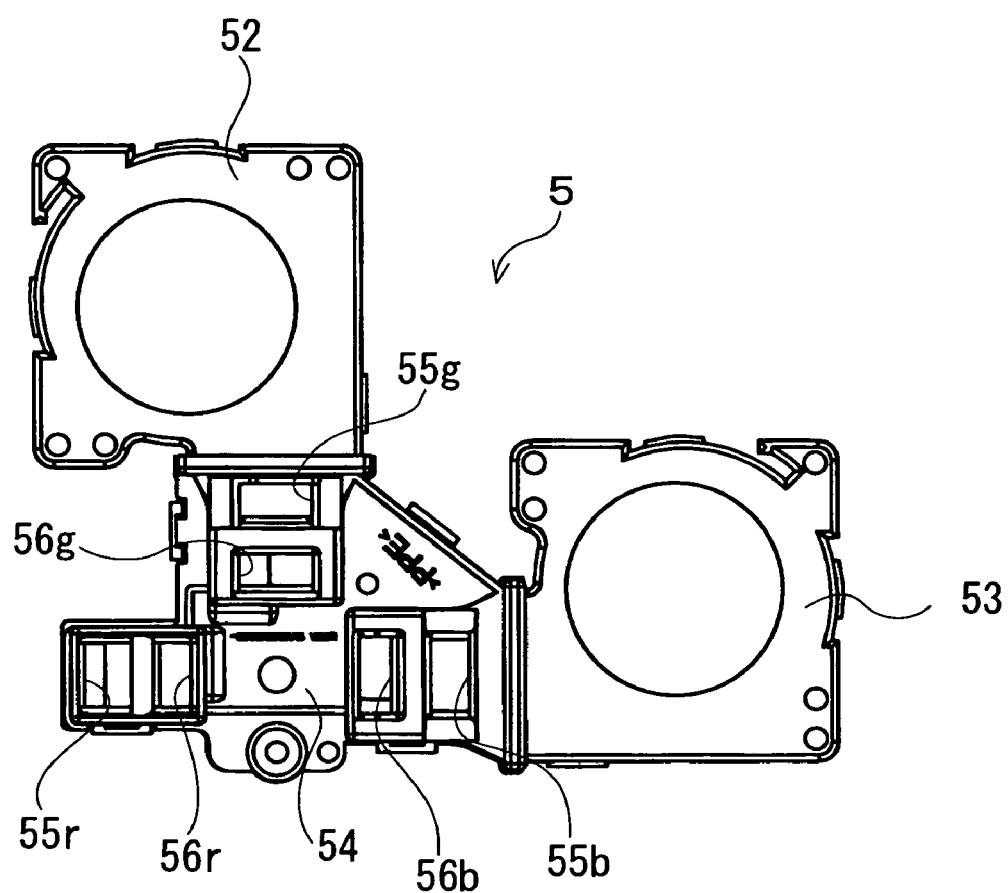
FIG. 19 is a plan view of the cooling unit.

As shown in FIG. 19, the cooling unit 5 includes the first fan 52, the second fan 53, and the approximately T-shaped housing 54. The channel for guiding outside air drawn from both cooling fans 52, 53 to the three liquid crystal panels 33b, 33g, 33r shown in FIG. 9 and the three incidence polarizing plates 32b, 32g, 32r shown in FIG. 5 is formed inside the housing 54. The first fan 52 and the second fan 53 are placed such that air discharge directions thereof intersect each other.

Figure 20:
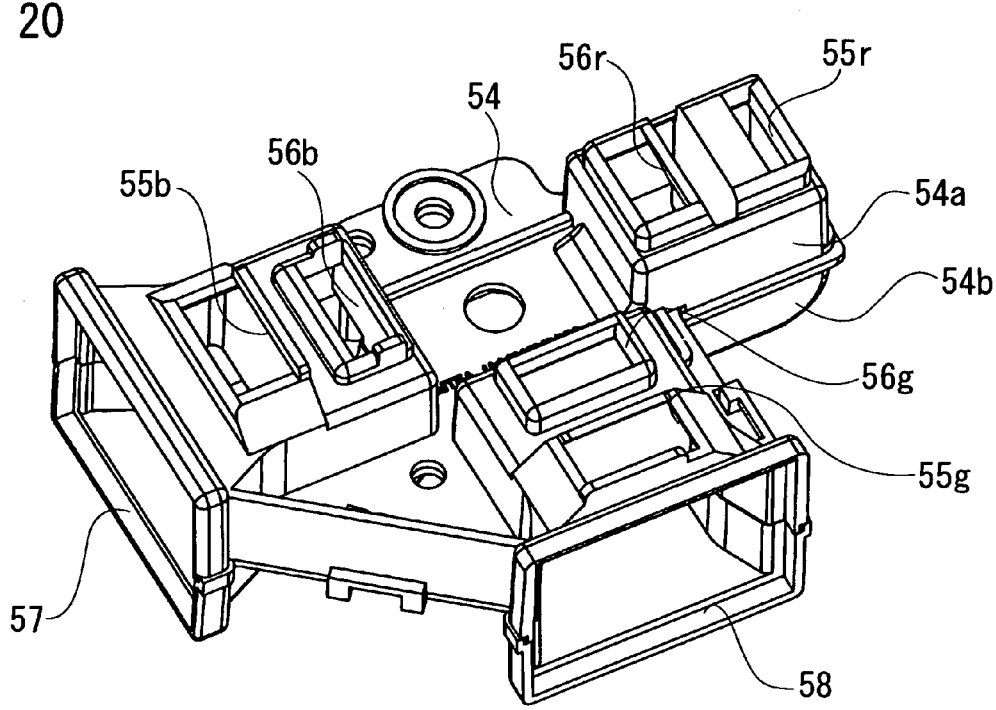
FIG. 20 is a perspective view of a housing of the cooling unit.
Figure 21:
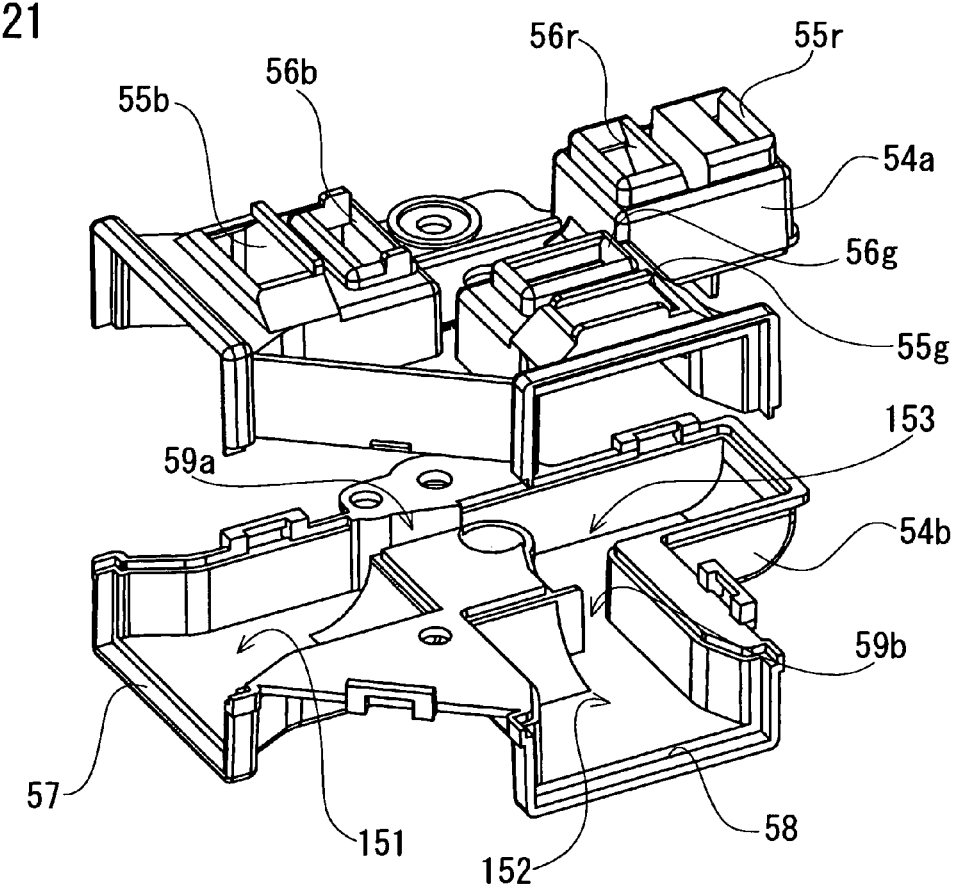
FIG. 21 is an exploded perspective view of the housing.

As shown in FIGS. 20 and 21, the housing 54 includes an upper housing half 54a and a lower housing half 54b joined to each other. The housing 54 is provided with a first attachment opening 57 for coupling the first fan 52 and a second attachment opening 58 for coupling the second fan 53, which face in directions different by 90 degrees.

The upper housing half 54a has an upper wall provided, in positions adjacent to the first attachment opening 57, with a first outlet for blue 55b for blowing air toward the incidence polarizing plate for blue 32b shown in FIG. 5, and a second outlet for blue 56b for blowing air toward the liquid crystal panel for blue 33b. Provided in positions adjacent to the second attachment opening 58 are a first outlet for green 55g for blowing air toward the incidence polarizing plate for green 32g shown in FIG. 5, and a second outlet for green 56g for blowing air toward the liquid crystal panel for green 33g.

Further, the upper wall of the upper housing half 54a is provided, in positions spaced apart from the first attachment opening 57 along a channel of air introduced from the first attachment opening 57, with a first outlet for red 55r for blowing air toward the incidence polarizing plate for red 32r shown in FIG. 5, and a second outlet for red 56r for blowing air toward the liquid crystal panel for red 33r.

Figure 22:
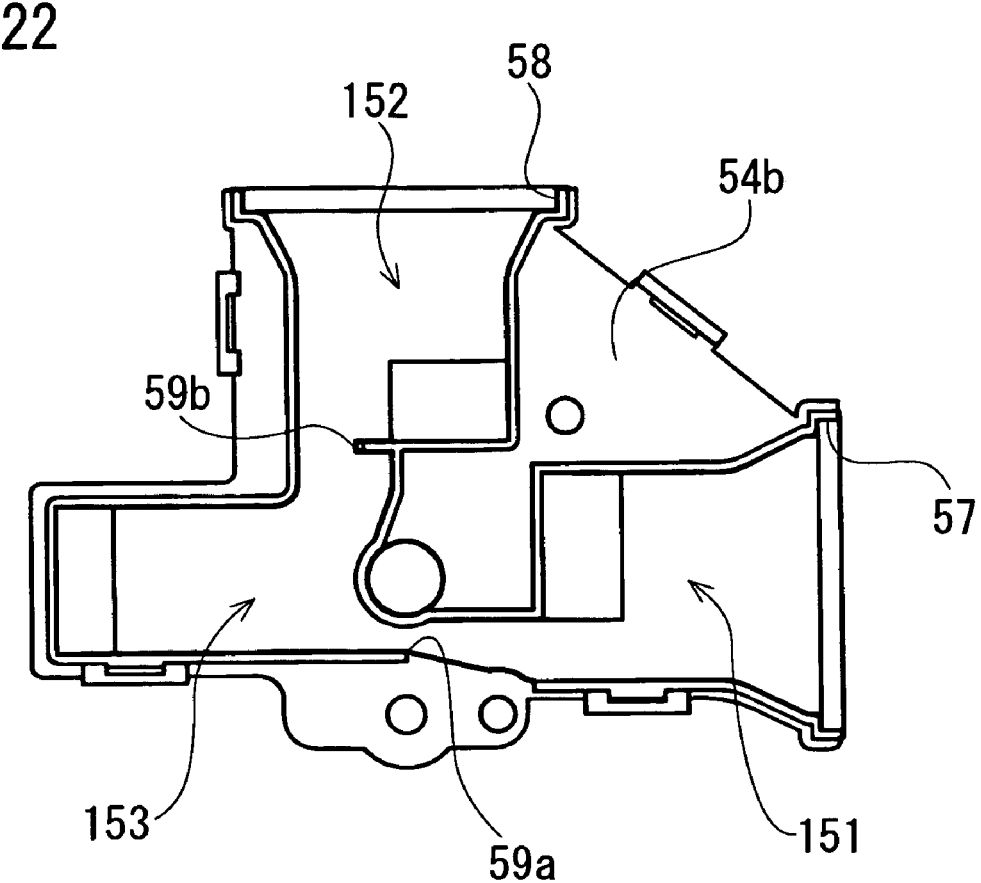
FIG. 22 is a plan view of a lower housing half constituting the housing.

On the other hand, as shown in FIG. 21 and FIG. 22, formed in the lower housing half 54b are a first upstream side channel 151 extending straight from the first attachment opening 57 to the first outlet for blue 55b and the second outlet for blue 56b, a second upstream side channel 152 extending straight from the second attachment opening 58 to the first outlet for green 55g and the second outlet for green 56g, and a downstream side channel 153 where the air having passed through the first and second upstream side channels 151, 152 joins together to reach the first outlet for red 55r and the second outlet for red 56r.

A first narrow portion 59a is formed between the first upstream side channel 151 and the downstream side channel 153, while a second narrow portion 59b is formed between the second upstream side channel 152 and the downstream side channel 153.

Therefore, the amount of air that is introduced from the first fan 52 to the first attachment opening 57 of the housing 54 and passes through the first upstream side channel 151 to flow into the downstream side channel 153 is restricted to a certain amount due to channel resistance occurring in the first narrow portion 59a. This causes the air introduced from the first attachment opening 57 to be partially discharged from the first outlet for blue 55b and the second outlet for blue 56b, which are provided at the upper stream side than the first narrow portion 59a. The incidence polarizing plate for blue 32b and the liquid crystal panel for blue 33b can be thereby sufficiently cooled.

Similarly, the amount of air that is introduced from the second fan 53 to the second attachment opening 58 of the housing 54 and passes through the second upstream side channel 152 to flow into the downstream side channel 153 is restricted to a certain amount due to channel resistance occurring in the second narrow portion 59b. This causes the air introduced from the second attachment opening 58 to be partially discharged from the first outlet for green 55g and the second outlet for green 56g, which are provided at the upper stream side than the second narrow portion 59b. The incidence polarizing plate for green 32g and the liquid crystal panel for green 33g can be thereby sufficiently cooled.

The certain amount of air having passed through the first narrow portion 59a flows straight through the downstream side channel 153 toward the first outlet for red 55r and the second outlet for red 56r. Further, the certain amount of air having passed through the second narrow portion 59b joins with the air flow through the downstream side channel 153 toward the first outlet for red 55r and the second outlet for red 56r. Consequently, the certain amount of air that has been introduced from the first attachment opening 57 and passed through the first narrow portion 59a and the certain amount of air that has been introduced from the second attachment opening 58 and passed through the second narrow portion 59b are discharged through the downstream side channel 153 from the first outlet for red 55r and the second outlet for red 56r. The incidence polarizing plate for red 32r and the liquid crystal panel for red 33r can be thereby sufficiently cooled.

With the conventional liquid crystal projector device, the cooling unit includes the three cooling fans respectively exclusively provided for the liquid crystal panels for red, green and blue. However, according to the above liquid crystal projector device of the present invention, the incidence polarizing plates 32r, 32g, 32g and liquid crystal panels 33r, 33g, 33b for three colors can be sufficiently cooled using the two cooling fans 52, 53. This allows the device to be made smaller by a mounting space for one omitted cooling fan, and also enables the total power consumption in operation to be reduced by a power consumption of the cooling fan.

Lamp Unit 4

Figure 23:
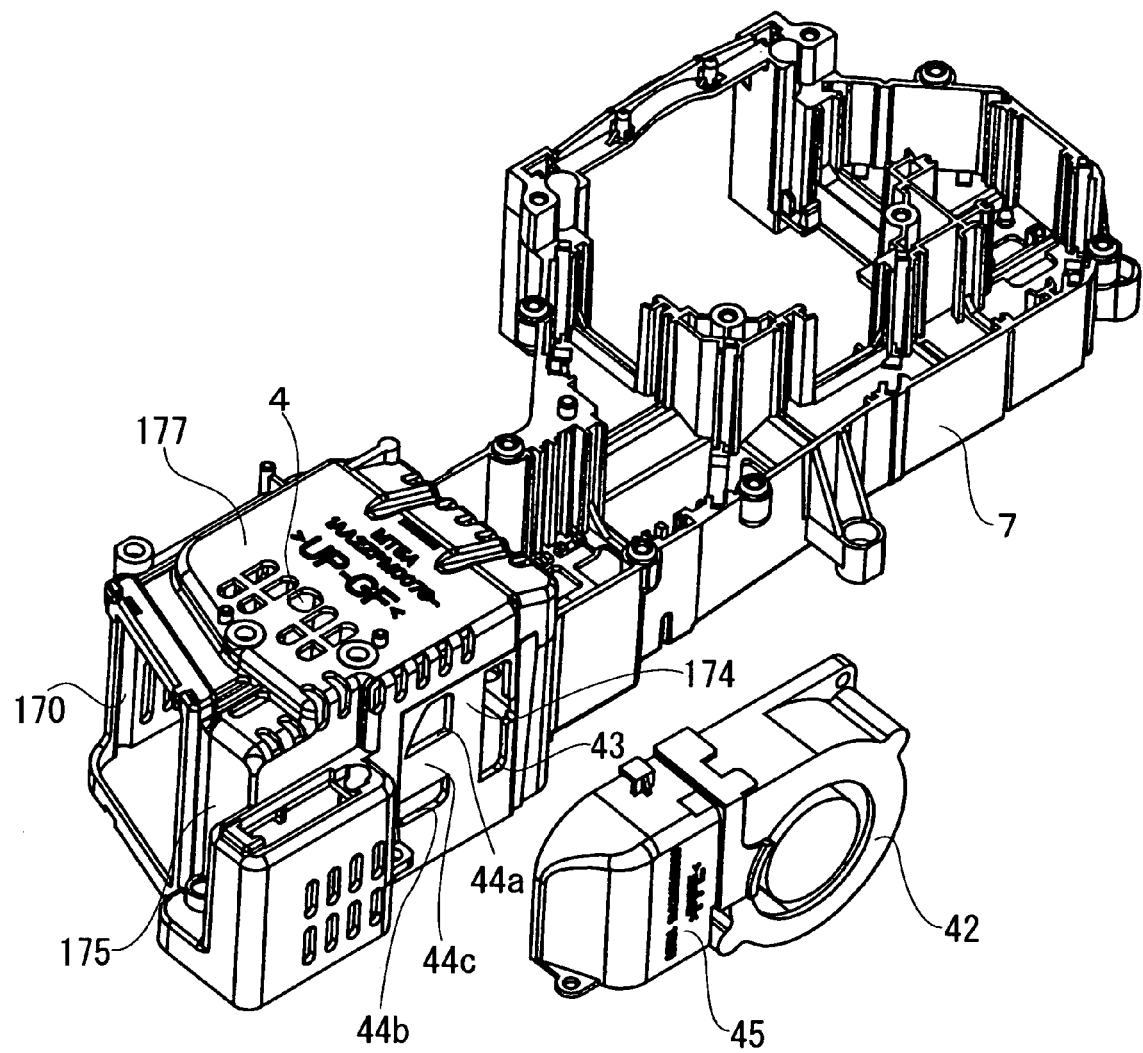
FIG. 23 is an exploded perspective view showing a lamp cooling fan being attached to the optical system holding case.

As shown in FIG. 2, the lamp unit 4 is contained at the right end in the optical system holding case 7. As shown in FIG. 23, an inlet housing 45 is attached to a rear wall 174 at the right end of the optical system holding case 7, and a lamp cooling fan 42 for cooling the lamp unit 4 is attached to an end of the inlet housing 45.

Figure 24:
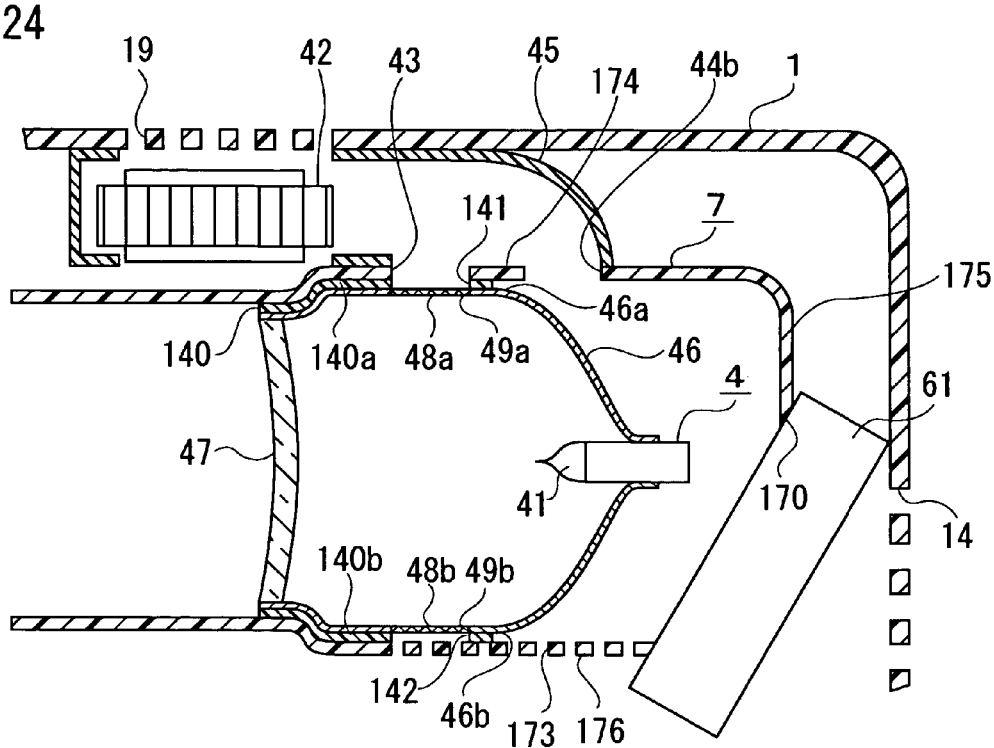
FIG. 24 is a horizontal sectional view of a lamp unit.
Figure 25:
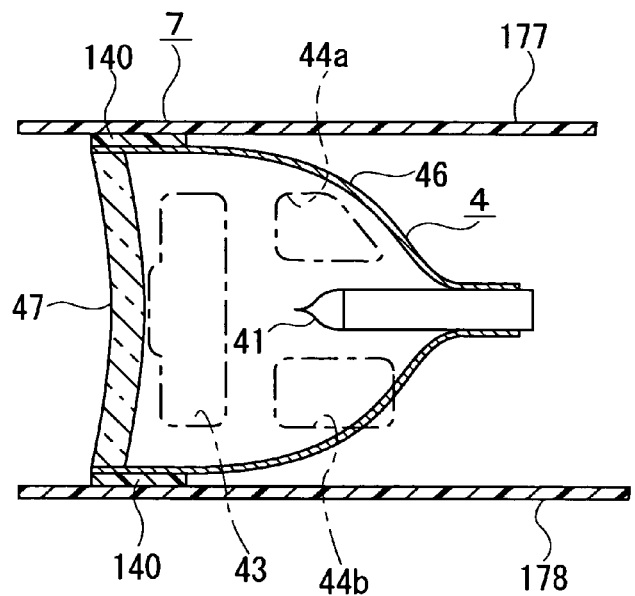
FIG. 25 is a vertical sectional view of the lamp unit.

As shown in FIG. 24 and FIG. 25, the lamp unit 4 includes a reflector 46, a lamp 41 provided at the focal position of the reflector 46, a lens 47 disposed forward along the light emergence direction of the lamp 41, and a lamp housing 140 made of a rectangular frame, and is constructed by attaching the reflector 46 and the lens 47 to the opening of the lamp housing 140. The reflector 46 has a back surface thereof surrounded by four side walls 174, 176, 177, 178 of the optical system holding case 7.

As shown in FIG. 24, the lamp unit 4 is contained at the right end in the optical system holding case 7 with both side walls 140a, 140b of the lamp housing 140 in contact with both side walls 174, 176 of the optical system holding case 7, respectively. An air introduction hole 141 is provided in the rear side wall 140a of the lamp housing 140. An opening 49a is provided in a rear side portion 46a of the reflector 46 in a position corresponding to the air introduction hole 141. A metal mesh filter 48a is placed in the opening 49a.

On the other hand, an air discharge hole 142 is provided in the front side wall 140b of the lamp housing 140 in a position opposed to the air introduction hole 141. An opening 49b is provided in a front side portion 46b of the reflector 46 in a position corresponding to the air discharge hole 142. A metal mesh filter 48b is placed in the opening 49b.

As shown in FIG. 23, the rear wall 174 at the right end of the optical system holding case 7 is provided with a first intake 43, a second intake 44a and a third intake 44b, which are for drawing air from the lamp cooling fan 42 into the optical system holding case 7. The first intake 43 has a rectangular opening shape long in the vertical direction (width direction). The second intake 44a and the third intake 44b are formed in a rectangle having a width of approximately one-third of that of the first intake 43. A wind blocking wall 44c having a width of approximately one-third of that of the first intake 43 is defined between both intakes 44a, 44b by a part of the rear wall 174 of the optical system holding case 7.

As shown in FIG. 24, the first intake 43 opens toward the air introduction hole 141 of the lamp housing 140 and the opening 49a of the reflector 46, and the second intake 44a and the third intake 44b open toward the back surface of the reflector 46.

As shown in FIG. 23, a vent 170 is provided in a right side wall 175 at the right end of the optical system holding case 7. As shown in FIG. 2, the first exhaust fan 61 included in the exhaust system 6 is placed facing the vent 170. The vent 170 is formed inclinedly relative to the right wall surface of the lower half case 12 having the exhaust system 6 attached thereto.

As shown in FIG. 2, the lower half case 12 has a rear wall thereof provided with a back inlet 19 with slits. The lamp cooling fan 42 shown in FIG. 23 is placed facing the back inlet 19.

As shown in FIG. 24, air drawn from the back inlet 19 of the casing 1 by the lamp cooling fan 42 is introduced through a channel in the inlet housing 45 from the first intake 43, the second intake 44a and the third intake 44b toward the lamp unit 4.

The air having passed through the first intake 43 is introduced through the air introduction hole 141 of the lamp housing 140 and the mesh filter 48a of the reflector 46 into the reflector 46, and discharged through the opposite mesh filter 48b and the air discharge hole 142 from exhaust slits 173 to the outside of the optical system holding case 7. The discharged high temperature air is sucked by the first exhaust fan 61, and discharged from the vent 14 of the casing 1 to the outside of the casing 1.

On the other hand, because the wind blocking wall 44c is provided between the second intake 44a and the third intake 44b as shown in FIG. 23, the air having passed through the second intake 44a flows along the upper portion of the reflector 46, and the air having passed through the third intake 44b flows along the lower portion of the reflector 46.

Then, the air flowing along the upper portion and lower portion of the reflector 46 is sucked by the first exhaust fan 61, and discharged from the vent 14 of the casing 1 to the outside of the casing 1.

The conventional liquid crystal projector device has no wind blocking wall 44c shown in FIG. 23, so that air is sent from one large blower opening where the second intake 44a is continuous with the third intake 44b to thereby cool the lamp unit 4. However, there has been a problem of an upper wall 177 and a lower wall 178 of the optical system holding case 7 shown in FIG. 25, although a sufficient air volume is given, deteriorating and degrading due to heat emitted from the lamp unit 4.

An analysis of a reason for this reveals that because the air sent from one blower opening largely flows along the back surface of the reflector 46 in a middle portion in the vertical direction of the reflector 46, although some cooling effect can be achieved in the middle portion, sufficient cooling effect cannot be achieved in upper and lower areas of the reflector 46 near the upper wall 177 and lower wall 178 of the optical system holding case 7.

Accordingly, with the liquid crystal projector device of the present invention, the above problem is solved by forcing the air delivered from the lamp cooling fan 42 to diverge toward the upper and lower areas of the reflector 46. The upper and lower areas of the reflector 46 can be thereby sufficiently cooled. Consequently, the temperature of the upper wall 177 and lower wall 178 of the optical system holding case 7 is lower than that of the conventional liquid crystal projector device, and therefore degradation due to deterioration of the optical system holding case 7 can be prevented.

Exhaust System 6

As shown in FIG. 2 and FIG. 3, the exhaust system 6 including the first exhaust fan 61 and the second exhaust fan 62 is attached to the right side wall of the lower half case 12.

The first exhaust fan 61 is placed with an inlet direction thereof toward the lamp unit 4, while the second exhaust fan 62 is placed with an inlet direction thereof toward the power unit 9. Exhaust directions of both exhaust fans 61, 62 intersect each other.

Figure 26:
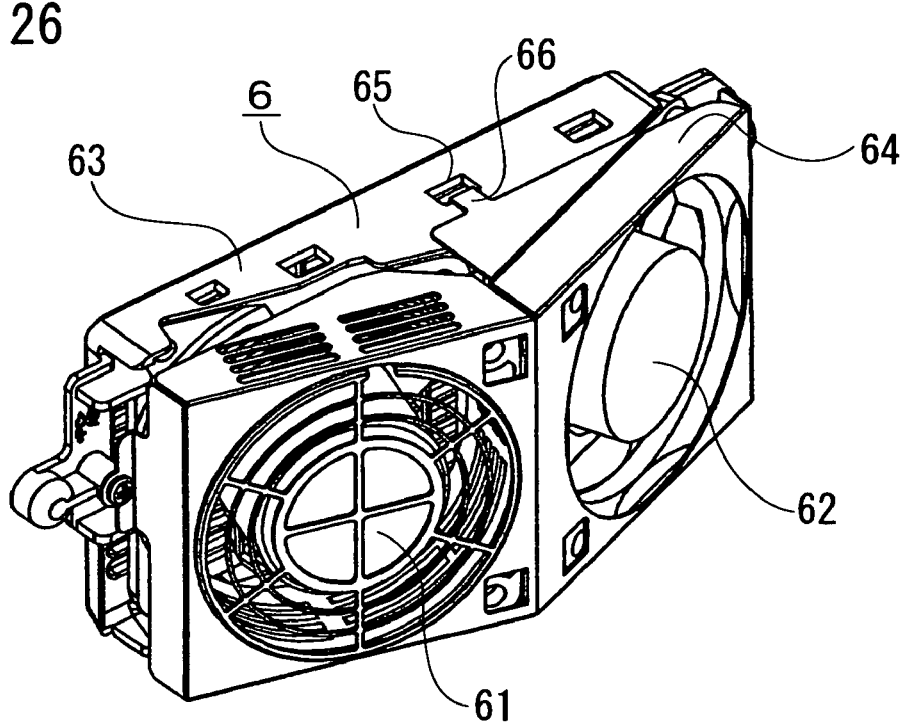
FIG. 26 is a perspective view of an exhaust system.
Figure 27:
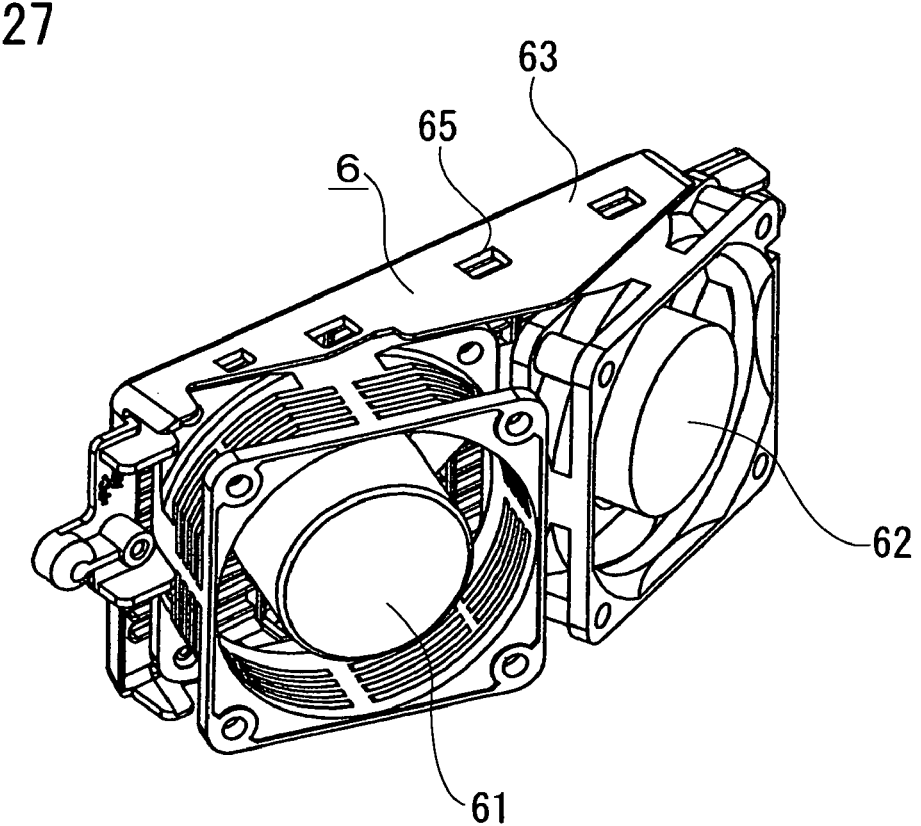
FIG. 27 is a perspective view showing the exhaust system with a fan cover thereof removed therefrom.

As shown in FIG. 26 and FIG. 27, the exhaust system 6 has the first exhaust fan 61 and the second exhaust fan 62 sandwiched between a synthetic resin fan holder 63 and a metal fan cover 64. A hook 66 to be engaged with a groove 65 provided in the upper wall and lower wall of the fan holder 63 is protruded on the upper surface and lower surface of the fan cover 64. The fan cover 64 is screwed at both sides with the hook 66 engaged with the groove 65 of the fan holder 63.

With the conventional liquid crystal projector device, an exhaust system consists of one exhaust fan placed toward the lamp unit 4. Therefore, the exhaust system discharges high temperature air around the lamp unit 4, so that a user could feel uncomfortable when touching the exhaust.

With the liquid crystal projector device of the present invention, because the first exhaust fan 61 included in the exhaust system 6 is placed toward the lamp unit 4 as shown in FIG. 2, the first exhaust fan 61 draws high temperature air emitted from the lamp unit 4. On the other hand, the second exhaust fan 62 draws lower temperature air than that of the air drawn by the first exhaust fan 61 because the second exhaust fan 62 is placed toward the power unit 9, which is placed in an area deviating from the lamp unit 4.

Because the exhaust directions of both exhaust fans 61, 62 intersect each other, the air drawn from the first exhaust fan 61 and the air drawn from the second exhaust fan 62 are mixed and then discharged from the vent 14. Consequently, the exhaust temperature is lower than that of the conventional projector device.

The more increases the intersection angle between the exhaust direction of the first exhaust fan 61 and the exhaust direction of the second exhaust fan 62, the larger is a necessary space inside the casing 1 for mounting both exhaust fans 61, 62. Accordingly, in order to find the intersection angle between the exhaust direction of the first exhaust fan 61 and the exhaust direction of the second exhaust fan 62 that gives the maximum exhaust temperature-lowering effect, an experiment was conducted where variations in exhaust temperature are measured with the intersection angle as a parameter. The result is that the intersection angle within a range of 40 degrees to 60 degrees gives the maximum exhaust temperature-lowering effect.

That is, if the intersection angle is smaller than 40 degrees, then the air drawn from both exhaust fans 61, 62 is discharged without sufficiently mixed. Consequently, high temperature air is discharged from the first exhaust fan 61 side of the exhaust system 6, and low temperature air is discharged from the second exhaust fan 62 side.

In contrast, when the intersection angle is 40 degrees to 60 degrees, the high temperature air drawn from the first exhaust fan 61 and the low temperature air drawn from the second exhaust fan 62 are sufficiently mixed. Consequently, the exhaust temperature is lower.

However, if the intersection angle is greater than 60 degrees, the lowering degree of the exhaust temperature relative to the increase of the intersection angle is smaller than in the case where the intersection angle is 40 degrees to 60 degrees. If the intersection angle approximates 90 degrees, then the high temperature air drawn from the first exhaust fan 61 and the low temperature air drawn from the second exhaust fan 62 hit each other. This inhibits a smooth rearward flow of air, preventing sufficient exhaust effect from being achieved.

Accordingly, in the present embodiment, the intersection angle between the exhaust direction of the first exhaust fan 61 and the exhaust direction of the second exhaust fan 62 is set to 40 degrees. The first exhaust fan 61 and the second exhaust fan 62 are each attached with an inclination angle of 20 degrees relative to the right wall surface of the casing 1. This allows the exhaust temperature to be lowered while minimizing enlargement of the device due to an increased mounting space for the exhaust system.

Actual measurement of the exhaust temperature and noise of the exhaust system 6 of the present embodiment reveals that even if both exhaust fans 61, 62 have revolutions less than conventional ones, the exhaust temperature is lowered by approximately 10° C., and the noise occurring from the exhaust system 6 can be reduced by 2 dB.

Further, the liquid crystal projector device of the present invention has a low power consumption mode where the power consumption is reduced by lowering the intensity of the light emitted from the lamp unit 4. When the low power consumption mode is set, the noise occurring from the exhaust system 6 can be further reduced by reducing the revolutions of the first and second exhaust fans 61, 62.

The present invention is not limited to the foregoing embodiment in construction but can be modified variously by one skilled in the art without departing from the spirit of the invention as set forth in the appended claims.

What is claimed is:

1. A projector device comprising a casing having disposed therein a light source and an optical system for receiving light from the light source to generate image light, the casing having a wall surface having attached thereto an exhaust system for cooling an inside of the casing, the exhaust system comprising a first exhaust fan and a second exhaust fan, which stand along the wall surface of the casing, both exhaust fans being placed with the directions of their rotation axes intersecting each other so that their exhaust directions intersect each other, the first exhaust fan having an inlet direction thereof toward the light source while the second exhaust fan having an inlet direction thereof toward an area deviating from the light source, air discharged from both exhaust fans is mixed since the exhaust directions intersect each other.

2. The projector device according to claim 1, wherein an intersection angle between the direction of the rotation axis of the first exhaust fan and the direction of the rotation axis of the second exhaust fan is set in a range of 40 degrees to 60 degrees.

3. The projector device according to claim 1, wherein the first exhaust fan and the second exhaust fan are each attached with an inclination angle relative to the wall surface of the casing.

4. The projector device according to claim 1, wherein the second exhaust fan is placed with the inlet direction toward a power unit arranged in a position spaced apart from the light source.

5. The projector device according to claim 1, wherein the projector device is adapted to change intensity of the light emitted from the light source to a plurality of levels, and comprises control means for variably setting revolutions of the first exhaust fan and/or the second exhaust fan depending on the intensity of the light.

* * * * *